US012440395B2

(12) United States Patent
Gao et al.

(10) Patent No.: US 12,440,395 B2
(45) Date of Patent: *Oct. 14, 2025

(54) PANT-TYPE ABSORBENT ARTICLE AND MANUFACTURING METHOD THEREOF

(71) Applicant: The Procter & Gamble Company, Cincinnati, OH (US)

(72) Inventors: Xu Gao, Beijing (CN); Ling Tong, Beijing (CN); Abhishek Prakash Surushe, Kelkhelm (DE); Koichi Morimoto, Beijing (CN); Hiroshi Fujikawa, Himeji (JP); Masayuki Tsuji, Kakogawa (JP); DonSub Lee, Kobe (JP); Kazuaki Tameishi, Kobe (JP)

(73) Assignee: The Procter & Gamble Company, Cincinnati, OH (US)

( * ) Notice: Subject to any disclaimer, the term of this patent is extended or adjusted under 35 U.S.C. 154(b) by 638 days.

This patent is subject to a terminal disclaimer.

(21) Appl. No.: 17/180,978

(22) Filed: Feb. 22, 2021

(65) Prior Publication Data

US 2021/0267815 A1 Sep. 2, 2021

(30) Foreign Application Priority Data

Feb. 28, 2020 (WO) ................ PCT/CN2020/077152
Jul. 24, 2020 (WO) ................ PCT/CN2020/104295

(51) Int. Cl.
*A61F 13/49* (2006.01)
*A61F 13/15* (2006.01)
(Continued)

(52) U.S. Cl.
CPC .. *A61F 13/49011* (2013.01); *A61F 13/15593* (2013.01); *A61F 13/15699* (2013.01);
(Continued)

(58) Field of Classification Search
CPC ........ A61F 2013/4948; A61F 13/49466; A61F 13/49058–49061; A61F 13/49011;
(Continued)

(56) References Cited

U.S. PATENT DOCUMENTS 4,938,755 A 7/1990 Foreman
5,030,303 A 7/1991 Cucuzza
(Continued)

FOREIGN PATENT DOCUMENTS

CN 1282234 A 1/2001
CN 1784192 A 6/2006
(Continued)

OTHER PUBLICATIONS

International Search Report and Written Opinion, PCT/CN2020/104295, date of mailing Jul. 24, 2020, 10 pages.
(Continued)

*Primary Examiner* — Susan S Su
(74) *Attorney, Agent, or Firm* — Charles R. Matson

(57) ABSTRACT

Disclosed is a pant type absorbent article having a waist guard portion on the front and/or back elastic belt, wherein the waist guard portion has a specific location in view of the location from the distal edge to the proximal edge relative to the percentage of the seam length LS, the waist guard portion comprising a waist guard elastic portion having a longitudinal dimension of no greater than about 40 mm, wherein the remainder of the elastic belt superposing the waist guard elastic portion is defined a correlated portion, wherein the tensile stress of the waist guard elastic portion is higher than that of the correlated portion.

20 Claims, 9 Drawing Sheets

(51) Int. Cl.
*A61F 13/494* (2006.01)
*A61F 13/496* (2006.01)
*A61F 13/53* (2006.01)
*A61F 13/84* (2006.01)

(52) U.S. Cl.
CPC .. *A61F 13/49012* (2013.01); *A61F 13/49014* (2013.01); *A61F 13/49453* (2013.01); *A61F 13/49466* (2013.01); *A61F 13/496* (2013.01); *A61F 13/4963* (2013.01); *A61F 13/53* (2013.01); *A61F 2013/15325* (2013.01); *A61F 2013/15365* (2013.01); *A61F 2013/49028* (2013.01); *A61F 2013/49033* (2013.01); *A61F 2013/49038* (2013.01); *A61F 2013/49076* (2013.01); *A61F 2013/49092* (2013.01); *A61F 2013/8402* (2013.01)

(58) Field of Classification Search
CPC .......... A61F 13/49012; A61F 13/49019; A61F 2013/49022–49039; A61F 13/15593; A61F 13/49014; A61F 13/496; A61F 13/4963; A61F 13/53; A61F 2013/15325; A61F 13/49453; A61F 2013/15365; A61F 2013/49028; A61F 2013/49033; A61F 2013/49038; A61F 13/49446
See application file for complete search history.

(56) References Cited

U.S. PATENT DOCUMENTS

| | | | |
|---|---|---|---|
| 5,569,227 A * | 10/1996 | Vandemoortele ... | A61F 13/4942 604/382 |
| 5,904,675 A | 5/1999 | Laux | |
| 8,518,010 B2 | 8/2013 | Kuwano et al. | |
| 8,939,956 B2 | 1/2015 | Mukai | |
| 9,023,006 B2 | 5/2015 | Takino et al. | |
| 9,107,778 B2 | 8/2015 | Sasayama et al. | |
| 10,406,040 B2 | 9/2019 | Chatterjee | |
| 11,607,350 B2 | 3/2023 | Morimoto et al. | |
| 2002/0045876 A1* | 4/2002 | Suzuki ............. | A61F 13/49466 604/385.28 |
| 2002/0058922 A1 | 5/2002 | Skog | |
| 2002/0120248 A1 | 8/2002 | Onishi et al. | |
| 2002/0183706 A1 | 12/2002 | Valentin | |
| 2003/0114819 A1 | 6/2003 | Sayama et al. | |
| 2003/0230378 A1 | 12/2003 | Olsson et al. | |
| 2007/0123834 A1 | 5/2007 | McDowall et al. | |
| 2010/0318054 A1 | 12/2010 | Langdon et al. | |
| 2012/0311770 A1* | 12/2012 | Nakajima ............. | A61F 13/513 2/400 |
| 2013/0310797 A1 | 11/2013 | Zink | |
| 2014/0031782 A1 | 1/2014 | Ichikawa et al. | |
| 2015/0173973 A1 | 6/2015 | Lavon et al. | |
| 2015/0182388 A1 | 7/2015 | Katsuragawa et al. | |
| 2015/0320612 A1 | 11/2015 | Seitz | |
| 2016/0270975 A1 | 9/2016 | Surushe et al. | |
| 2016/0270977 A1* | 9/2016 | Surushe ............ | A61F 13/49466 |
| 2016/0270979 A1 | 9/2016 | Raycheck et al. | |
| 2016/0287449 A1 | 10/2016 | Surushe et al. | |
| 2017/0000658 A1 | 1/2017 | Chatterjee | |
| 2017/0143560 A1 | 5/2017 | Morimoto et al. | |
| 2017/0246055 A1* | 8/2017 | Barnes ............. | A61F 13/15747 |
| 2018/0071155 A1* | 3/2018 | Bishop .............. | A61F 13/49473 |
| 2018/0104116 A1 | 4/2018 | Bishop et al. | |
| 2018/0221219 A1 | 8/2018 | Morimoto et al. | |
| 2018/0289562 A1 | 10/2018 | Inoue | |
| 2019/0350771 A1 | 11/2019 | Chatterjee | |
| 2020/0197560 A1 | 6/2020 | Buchalter | |
| 2021/0093193 A1 | 4/2021 | Birkner | |
| 2021/0100695 A1 | 4/2021 | Ishibashi et al. | |
| 2021/0113388 A1 | 4/2021 | Matsui | |
| 2022/0339044 A1 | 10/2022 | Surushe et al. | |
| 2022/0362068 A1 | 11/2022 | Luan et al. | |
| 2022/0362070 A1 | 11/2022 | Gao et al. | |
| 2024/0082073 A1 | 3/2024 | Mun | |

FOREIGN PATENT DOCUMENTS

| | | |
|---|---|---|
| CN | 1903152 A | 1/2007 |
| CN | 101785729 A | 7/2010 |
| CN | 103282000 A | 9/2013 |
| CN | 104349756 A | 2/2015 |
| CN | 205054607 U | 3/2016 |
| CN | 107405232 A | 11/2017 |
| CN | 107427395 A | 12/2017 |
| CN | 107427403 A | 12/2017 |
| CN | 107820419 A | 3/2018 |
| CN | 107920934 A | 4/2018 |
| CN | 108093621 A | 5/2018 |
| CN | 108601690 A | 9/2018 |
| CN | 109758299 A | 5/2019 |
| CN | 109982669 A | 7/2019 |
| CN | 110290772 A | 9/2019 |
| EP | 2529717 A1 | 12/2012 |
| EP | 3162337 A1 | 5/2017 |
| EP | 3287108 A1 | 2/2018 |
| EP | 3351227 A1 | 7/2018 |
| JP | 07184955 | 7/1995 |
| JP | H08154971 A | 6/1996 |
| JP | 2001212176 A | 8/2001 |
| JP | 2001252303 A | 9/2001 |
| JP | 2006263306 A | 10/2006 |
| JP | 2008237391 A5 | 10/2008 |
| JP | 2009207778 A | 9/2009 |
| JP | 2009219627 A | 10/2009 |
| JP | 2011156110 A | 8/2011 |
| JP | 2016112208 A | 6/2016 |
| JP | 3211442 U | 6/2017 |
| JP | 2018061839 A | 4/2018 |
| JP | 2018082865 A | 5/2018 |
| JP | 2018104116 A | 7/2018 |
| JP | 2018108337 A | 7/2018 |
| JP | 2018118093 A | 8/2018 |
| JP | 2019115461 A | 7/2019 |
| JP | 2020135072 A | 8/2020 |
| WO | 0072791 A1 | 12/2000 |
| WO | 2006017718 A1 | 2/2006 |
| WO | 2009084643 A1 | 7/2009 |
| WO | 2011087503 A1 | 7/2011 |
| WO | 2012105212 A1 | 8/2012 |
| WO | 2016029655 A1 | 3/2016 |
| WO | 2016159983 A1 | 10/2016 |
| WO | 2016170909 A1 | 10/2016 |
| WO | 2017003423 A1 | 1/2017 |
| WO | 2018123154 A1 | 7/2018 |
| WO | 2018152834 A1 | 8/2018 |
| WO | 2019038956 A1 | 2/2019 |
| WO | 2019073684 A1 | 4/2019 |
| WO | 2021168782 A1 | 9/2021 |
| WO | 2021170026 A1 | 9/2021 |

OTHER PUBLICATIONS

International Search Report and Written Opinion; Application Ser. No. PCT/CN2020/077152; dated Nov. 26, 2020; 10 pages.
All Office Actions; U.S. Appl. No. 17/724,529, filed Apr. 20, 2022.
Unpublished U.S. Appl. No. 17/724,529, filed Apr. 20, 2022, to Abhishek Prakash Surushe et al.
AA01394MQ Extended European Search Report and Search Opinion; Application No. 20920891.7; dated Mar. 11, 2024; 07 pages.
All Office Actions; U.S. Appl. No. 17/875,471, filed Jul. 28, 2022.
All Office Actions; U.S. Appl. No. 17/875,476, filed Jul. 28, 2022.
All Office Actions; U.S. Appl. No. 17/875,463, filed Jul. 28, 2022.
All Office Actions; U.S. Appl. No. 17/180,978, See Pair.
All Office Actions; U.S. Appl. No. 19/205,029, filed on May 12, 2025; See Pair.

(56) References Cited

OTHER PUBLICATIONS

U.S. Appl. No. 19/205,029, filed on May 12, 2025, to Xu Gao et. al. (See Pair).

* cited by examiner

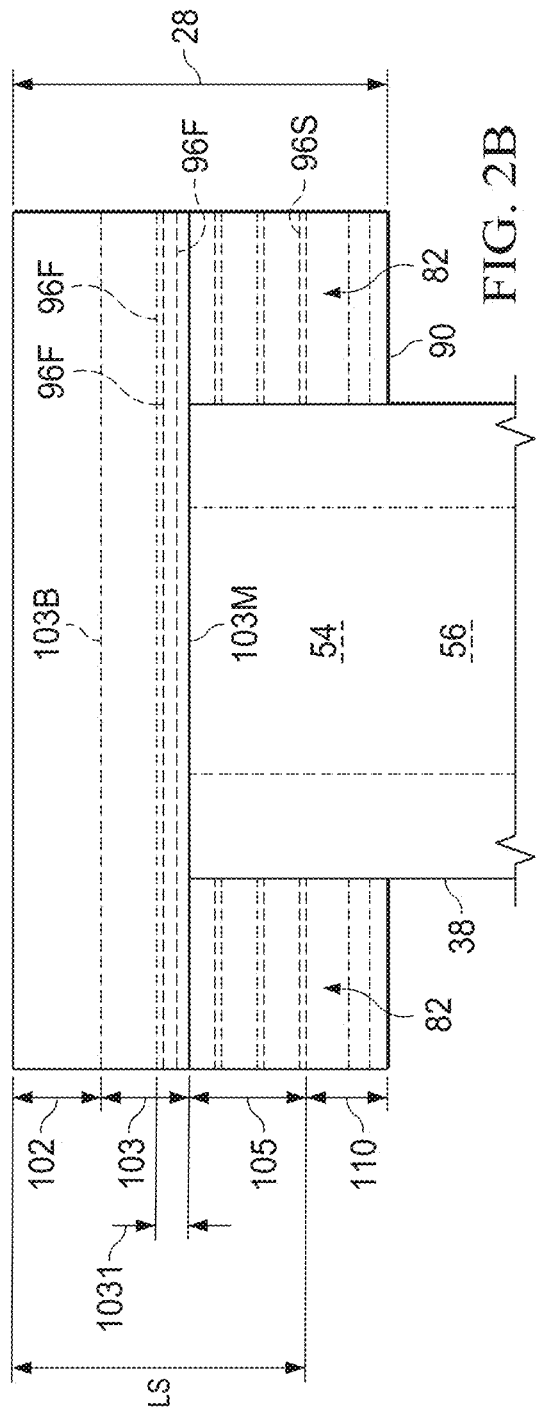
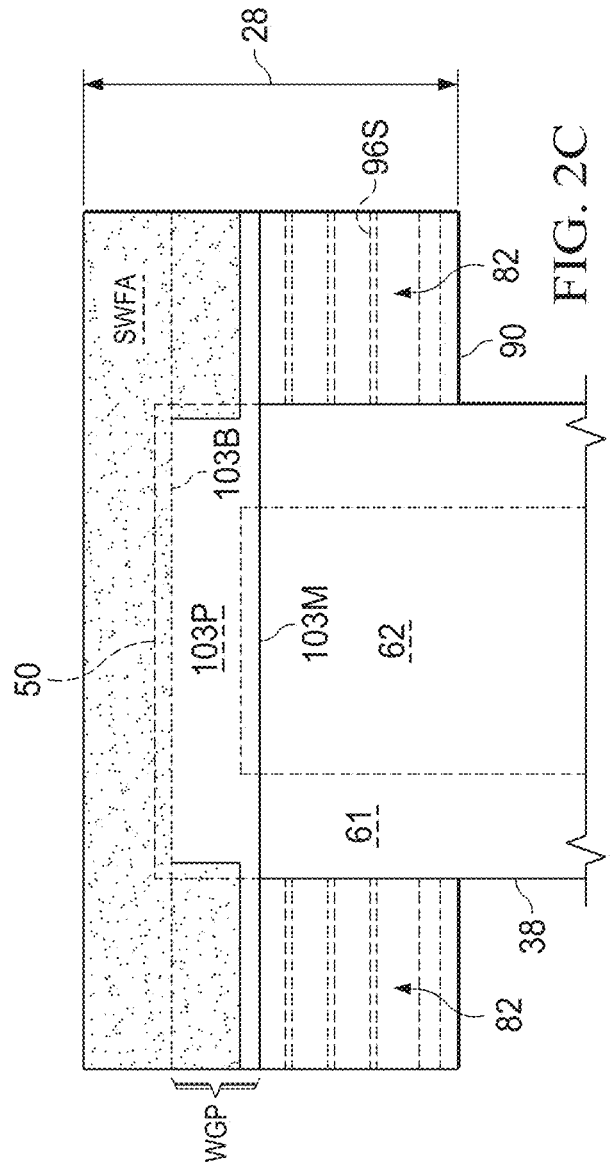

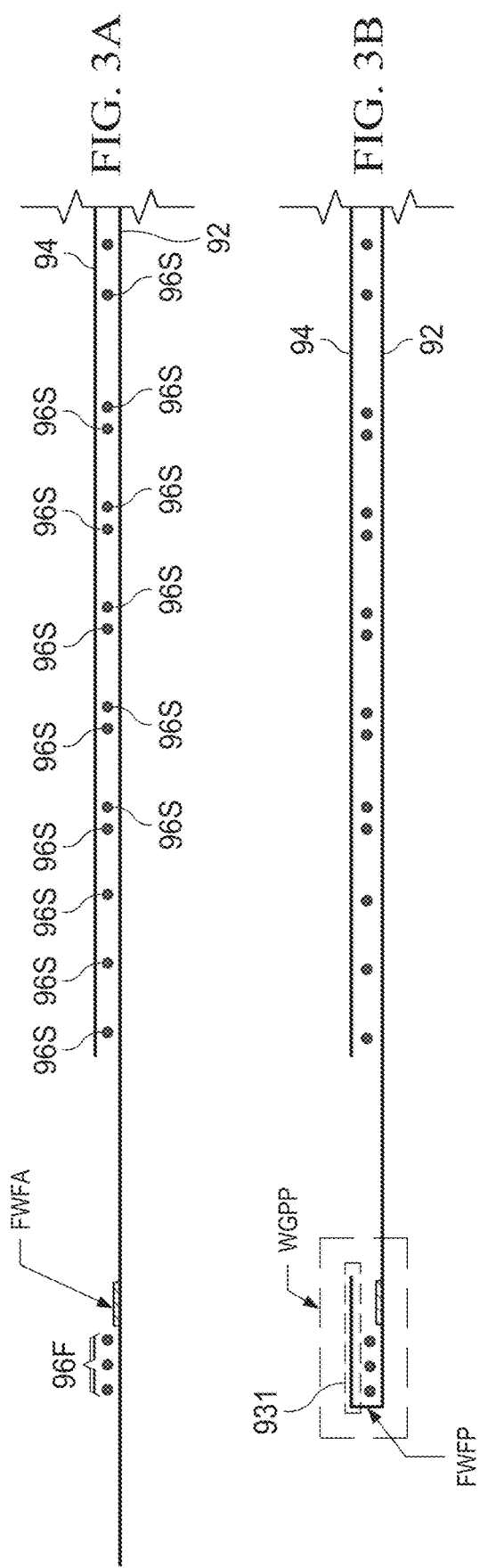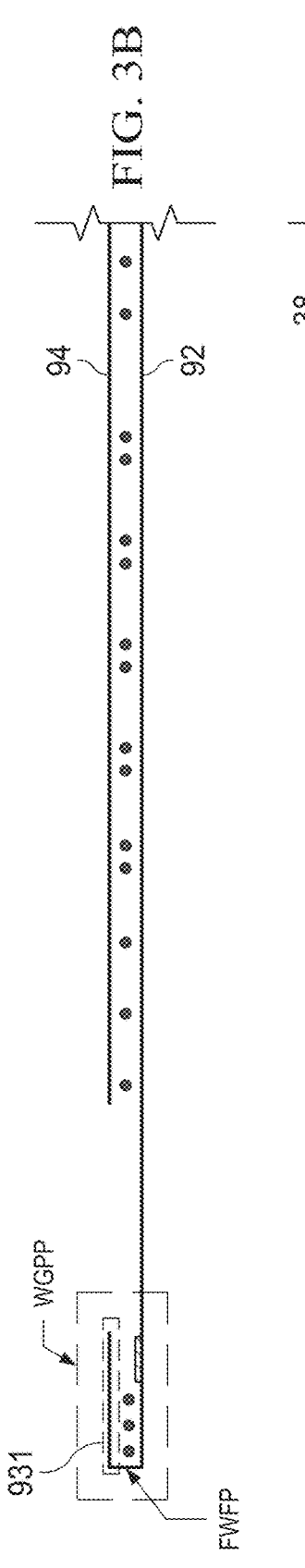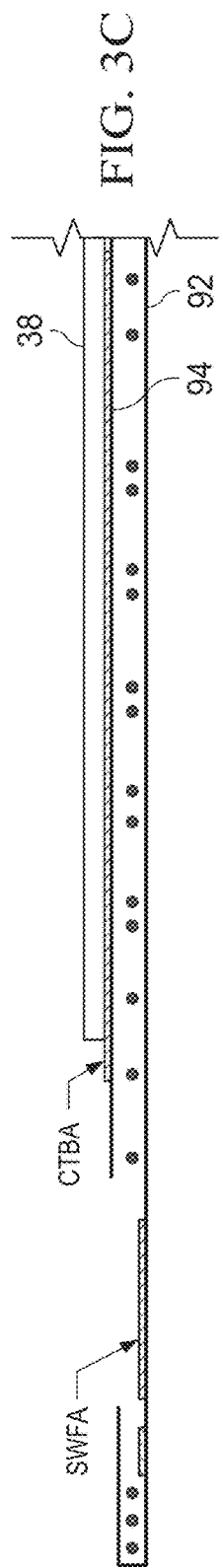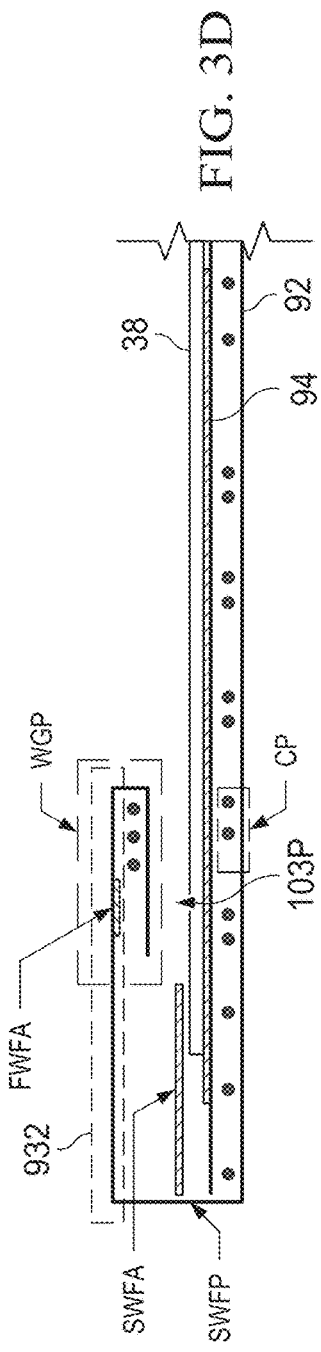

PANT-TYPE ABSORBENT ARTICLE AND MANUFACTURING METHOD THEREOF

CROSS REFERENCE TO RELATED APPLICATIONS

This application claims priority to Chinese PCT Patent Application No. PCT/CN2020/104295, filed on Jul. 24, 2020 and to Chinese PCT Patent Application Serial No. PCT/CN2020/077152, filed on Feb. 28, 2020, both of which are incorporated by reference herein.

FIELD OF THE INVENTION

The present invention relates to pant-type absorbent articles having a protective measure for preventing leakage of low viscosity bodily exudates, while also maintaining other functions as a pant-type wearable article. The present invention also relates to methods of manufacturing such pant-type absorbent articles.

BACKGROUND OF THE INVENTION

Infants and other individuals wear absorbent articles such as diapers to receive and contain urine and other body exudates. Pull-on absorbent articles, or pant-type absorbent articles, such as described in PCT Publication WO 2006/17718 A, are those which are donned by inserting the wearer's legs into the leg openings and sliding the article up into position about the lower torso. Pant-type absorbent articles have become popular for younger babies requiring a soft fit around the waist opening and leg openings. Pant-type absorbent articles have also become popular for females having heavy flow or overnight usage during menstruation periods. One function desired for a pant-type article is a protective measure for preventing leakage of low viscosity bodily exudates through the waist opening. Those pant-type articles having less material around the waist opening for breathability purpose or otherwise, may have risk of leakage from the waist opening, particularly when the wearer is lying on his/her back or belly.

Pant-type articles may take various structures wherein the circumference of the waist opening and vicinity thereof is made elastic enough to facilitate the wearer or the caregiver to expand the article and insert the wearer's legs into the leg openings for wearing the article. Accordingly, pant-type articles provide only a very small range of size adjustment or body configuration adjustment based on the structural limitations of the article. As such, pant-type articles are typically so configured to accommodate size and configuration ranges by providing the elastic belt region very stretchable and comfortable to wear, yet with reliable fit such that sufficient protection against sagging and leakage may be provided. It is desired that such basic functions of the elastic belt region may be maintained even with introduction of the aforementioned protective measure.

Based on the foregoing, there is a need for an absorbent article provided with a protective measure for preventing leakage of low viscosity bodily exudates from the waist opening, while maintaining good stretchability for ease of application, good fit for preventing sagging, good comfort and softness, and good breathability. There is also a need for providing such an absorbent article which can be economically made.

SUMMARY OF THE INVENTION

The present invention is directed to an absorbent article having a longitudinal direction and a transverse direction comprising a front elastic belt, a back elastic belt, a crotch region, a waist opening, and a pair of leg openings; the crotch region extending longitudinally between the front elastic belt and the back elastic belt;

the absorbent article comprising an absorbent main body extending the entire longitudinal dimension of the crotch region and further extending partly into each of the front elastic belt and the back elastic belt, the absorbent main body comprising a liquid pervious topsheet, a liquid impervious backsheet, and an absorbent material region sandwiched therebetween;

the entirety of the length of the transverse edges of the front elastic belt is seamed with a certain length of the transverse edges of the back elastic belt to define a pair of side seams, wherein the side seams have a seam length LS;

the front and/or back elastic belt divided into multiple zones spanning in the transverse direction and defined by its location from the distal edge to the proximal edge relative to the percentage of the seam length LS wherein the distal edge is considered 0% and the proximal edge is considered 100% wherein; a waist guard portion is disposed within a location of from about 25% to about 60% of LS, the waist guard portion extending towards the crotch region from a closed base line towards an open edge, wherein the waist guard portion is partially bonded to the remainder of the front and/or back elastic belt comprising the waist guard portion to define a pocket, wherein the area of the pocket substantially superposes the backsheet, the waist guard portion comprising a waist guard elastic portion having a longitudinal dimension of no greater than about 40 mm, wherein the remainder of the front and/or back elastic belt comprising the waist guard portion and superposing the waist guard elastic portion is defined a correlated portion, wherein the tensile stress of the waist guard elastic portion is higher than that of the correlated portion.

The present invention is also directed to manufacturing methods of the above mentioned articles.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings and which like designations are used to designate substantially identical elements, and in which:

FIG. 2B-2C are schematic plan views of one belt embodiment of the present invention with the seams unjoined and in a flat uncontracted condition showing the body facing surface.

FIGS. 3A-3C are schematic cross section views of precursors for making the embodiment of FIGS. 2A-2C taken along line L2, with the thickness dimension exaggerated.

FIG. 3D is a schematic cross section view of the embodiment of FIGS. 2A-2C, with the thickness dimension exaggerated.

DEFINITIONS

Figure 1:
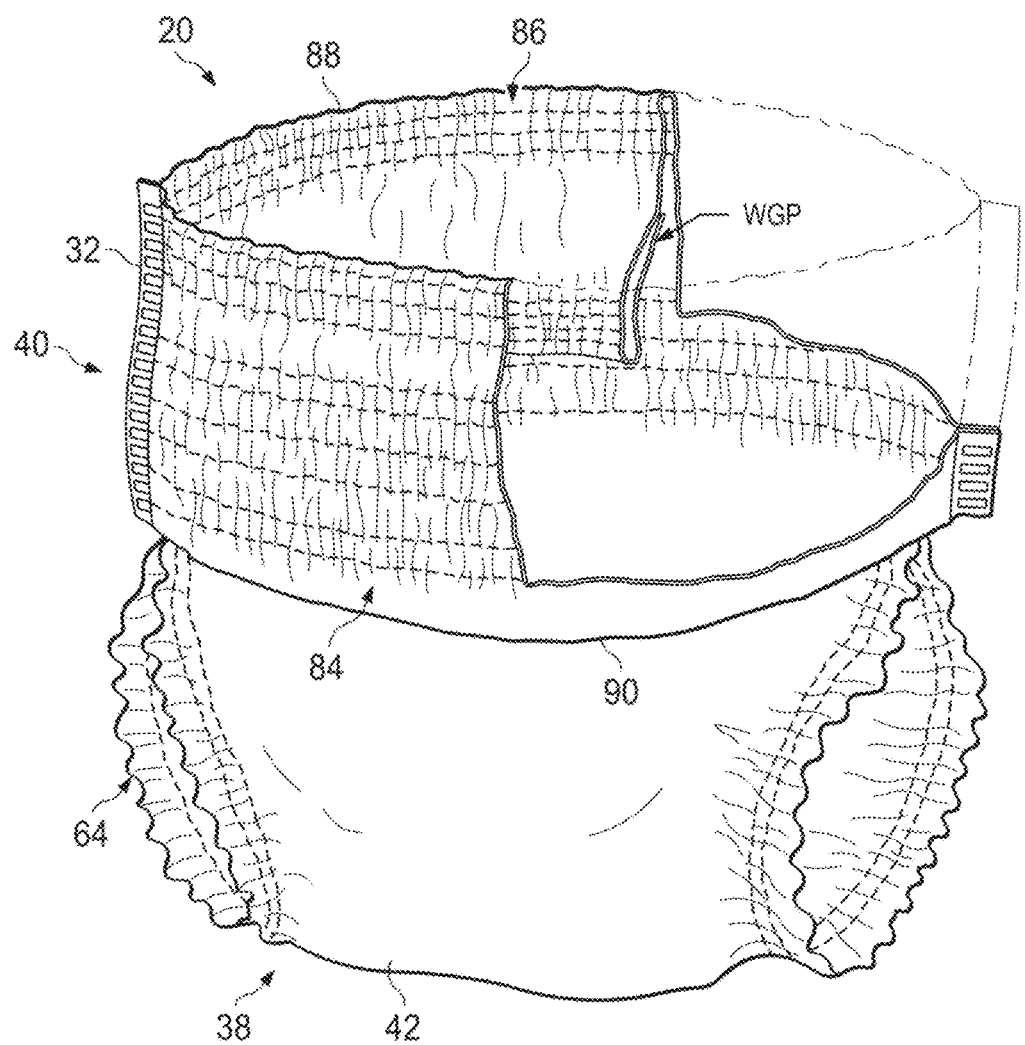
FIG. 1 is a perspective view of one embodiment of an absorbent article of the present invention.

As used herein, the following terms shall have the meaning specified thereafter: "Absorbent article" refers to articles of wear which may be in the form of pants, taped diapers, incontinent briefs, feminine hygiene garments, and the like, so configured to also absorb and contain various exudates such as urine, feces, and menses discharged from the body. The "absorbent article" may serve as an outer cover adaptable to be joined with a separable disposable absorbent insert for providing absorbent and containment function, such as those disclosed in PCT publication WO 2011/087503 A.

"Pant" refers to disposable absorbent articles having a pre-formed waist and leg openings. A pant may be donned by inserting a wearer's legs into the leg openings and sliding the pant into position about the wearer's lower torso. Pants are also commonly referred to as "closed diapers", "prefastened diapers", "pull-on diapers", "training pants" and "diaper-pants".

"Longitudinal" refers to a direction running substantially perpendicular from a waist edge to an opposing waist edge of the article and generally parallel to the maximum linear dimension of the article.

"Transverse" refers to a direction perpendicular to the longitudinal direction.

"Proximal" and "distal" refer respectively to the position closer or farther relative to the longitudinal center of the article.

"Body-facing" and "garment-facing" refer respectively to the relative location of an element or a surface of an element or group of elements. "Body-facing" implies the element or surface is nearer to the wearer during wear than some other element or surface. "Garment-facing" implies the element or surface is more remote from the wearer during wear than some other element or surface (i.e., element or surface is proximate to the wearer's garments that may be worn over the disposable absorbent article).

"Disposed" refers to an element being located in a particular place or position.

"Joined" refers to configurations whereby an element is directly secured to another element by affixing the element directly to the other element and to configurations whereby an element is indirectly secured to another element by affixing the element to intermediate member(s) which in turn are affixed to the other element.

"Film" refers to a sheet-like material wherein the length and width of the material far exceed the thickness of the material. Typically, films have a thickness of about 0.5 mm or less.

"Water-permeable" and "water-impermeable" refer to the penetrability of materials in the context of the intended usage of disposable absorbent articles. Specifically, the term "water-permeable" refers to a layer or a layered structure having pores, openings, and/or interconnected void spaces that permit liquid water, urine, or synthetic urine to pass through its thickness in the absence of a forcing pressure. Conversely, the term "water-impermeable" refers to a layer or a layered structure through the thickness of which liquid water, urine, or synthetic urine cannot pass in the absence of a forcing pressure (aside from natural forces such as gravity). A layer or a layered structure that is water-impermeable according to this definition may be permeable to water vapor, i.e., may be "vapor-permeable".

"Extendibility" and "extensible" mean that the width or length of the component in a relaxed state can be extended or increased.

"Elasticated" and "elasticized" mean that a component comprises at least a portion made of elastic material.

"Elongatable material", "extensible material", or "stretchable material" are used interchangeably and refer to a material that, upon application of a biasing force, can stretch to an elongated length of at least about 110% of its relaxed, original length (i.e. can stretch to 10 percent more than its original length), without rupture or breakage, and upon release of the applied force, shows little recovery, less than about 20% of its elongation without complete rupture or breakage as measured by EDANA method 20.2-89. In the event such an elongatable material recovers at least 40% of its elongation upon release of the applied force, the elongatable material will be considered to be "elastic" or "elastomeric." For example, an elastic material that has an initial length of 100 mm can extend at least to 150 mm, and upon removal of the force retracts to a length of at least 130 mm (i.e., exhibiting a 40% recovery). In the event the material recovers less than 40% of its elongation upon release of the applied force, the elongatable material will be considered to be "substantially non-elastic" or "substantially non-elastomeric". For example, an elongatable material that has an initial length of 100 mm can extend at least to 150 mm, and upon removal of the force retracts to a length of at least 145 mm (i.e., exhibiting a 10% recovery).

"Dimension", "Length", "Width", "Pitch", "Diameter", "Aspect Ratio", "Angle", and "Area" of the article are all measured in a state wherein the article is extended to the Full Stretch Circumference Wi according to the "Whole Article Force Measurement" herein, and utilizing a ruler or a loupe, unless specified otherwise.

"Artwork" refers to a visual presentation to the naked eye, which is provided by printing or otherwise, and having a color. Printing includes various methods and apparatus well known to those skilled in the art such as lithographic, screen printing, flexographic, and gravure ink jet printing techniques.

"Color" or "Colored" as referred to herein includes any primary color except color white, i.e., black, red, blue, violet, orange, yellow, green, and indigo as well as any declination thereof or mixture thereof. The color white is defined as those colors having a L* value of at least 94, an a* value equal to 0±2, and a b* value equal to 0±2 according to the CIE L* a* b* color system.

DETAILED DESCRIPTION OF THE INVENTION

Figure 2A:
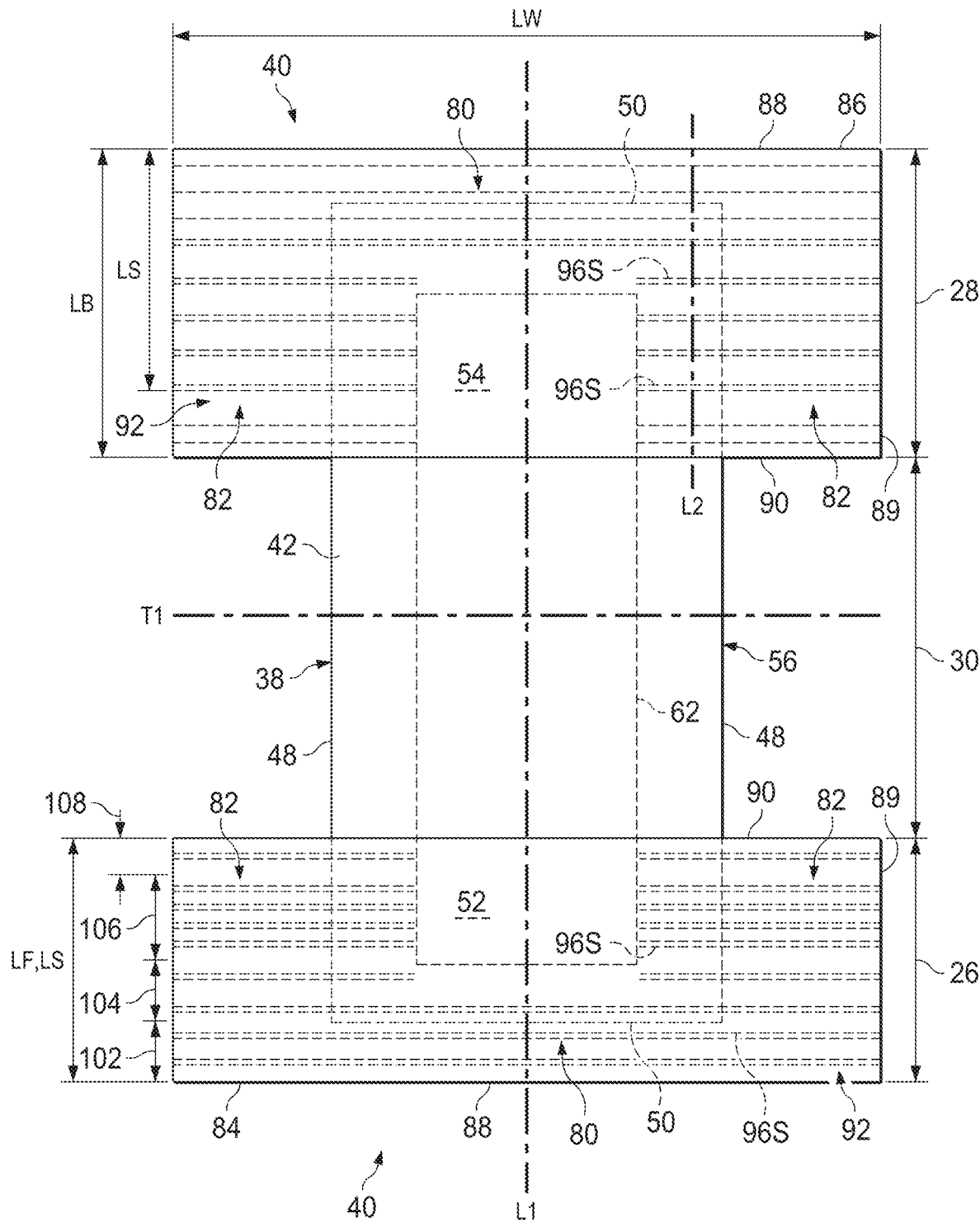
FIG. 2A is a schematic plan view of one embodiment of an absorbent article of the present invention with the seams unjoined and in a flat uncontracted condition showing the garment facing surface.

FIG. 1 is a perspective view of an absorbent article (20) of the present invention, and FIG. 2A is a schematic plan view of an absorbent article with the seams unjoined and in its flat uncontracted condition showing the garment-facing surface. The absorbent article (20) has a longitudinal centerline L1 which also serves as the longitudinal axis, and a transverse centerline T1 which also serves as the transverse axis. The absorbent article (20) has a body facing surface, a garment facing surface, a front elastic belt (84), a back elastic belt (86), a crotch region (30), and side seams (32) which join the front elastic belt (84) and the back elastic belt (86), to form two leg openings and a waist opening.

The absorbent article (20) may be a belt-type pant as in FIGS. 1 and 2A-2C comprising an absorbent main body (38) to cover the crotch region (30) of the wearer, a front elastic belt (84) and a back elastic belt (86) (hereinafter may be referred to as "front and back elastic belts"), the front and back elastic belts (84, 86) forming a discrete ring-like elastic belt (40) extending transversely defining the waist opening. For the belt-type pant, the discrete ring-like elastic belt (40) may also be referred to as the elastic belt (40). For the belt-type pant as in FIGS. 1 and 2A-2C, the front and back elastic belts (84, 86) and the absorbent main body (38) jointly define the leg openings. For the belt-type pant, the front elastic belt (84) is the front region (26), and the back elastic belt (86) is the back region (28), and the remainder is the crotch region (30). While not shown, the absorbent article (20) may be a uni-body type pant configured such that the outer cover layer of the absorbent main body (38) and the garment facing layer of the elastic belt (40) are common. For the uni-body type pant, the portion extending in the transverse direction between the side seams (32), respectively, are considered the front region (26) and the back region (28), and the remainder is the crotch region (30). For the uni-body type pant, the front region (26) is considered the front elastic belt (84), and the back region (28) is considered the back elastic belt (86).

The absorbent main body (38) comprises a topsheet, a backsheet and an absorbent material region (62) disposed between the topsheet and the backsheet. The absorbent main body (38) may further comprise an outer cover layer (42) for covering the garment-facing side of the backsheet. The topsheet may be a water permeable substrate. The backsheet may be a water impermeable film. The outer cover layer (42) may be a nonwoven sheet. The absorbent main body (38) comprises an absorbent material region (62) for absorbing and containing body exudates disposed on the absorbent main body (38), and an absorbent material non-existing region (61) surrounding the periphery of the absorbent material region (62). The area adjacent the front and back longitudinal end edges of the absorbent main body (38) comprise the backsheet. The absorbent material non-existing region (61) may be made of the topsheet and/or the backsheet and/or the outer cover layer (42) and/or other parts configuring the absorbent main body (38). In the embodiment shown in FIGS. 2A-2C, the absorbent main body (38) has a generally rectangular shape, left and right longitudinally extending side edges (48) and front and back transversely extending end edges (50). The absorbent material region (62) may exist through the entire longitudinal dimension of the crotch region and extending at least partly in the front and back regions (26, 28). The absorbent main body (38) may have a front waist panel (52) positioned in the front region (26) of the absorbent article (20), a back waist panel (54) positioned in the back region (28), and a crotch panel (56) between the front and back waist panels (52, 54) in the crotch region (30). The center of the front elastic belt (84) is joined to a front waist panel (52) of the absorbent main body (38), the center of the back elastic belt (86) is joined to a back waist panel (54) of the absorbent main body (38), the front and back elastic belts (84, 86) each having a left side panel and a right side panel (82) where the absorbent main body (38) does not overlap. The absorbent main body (38) has a crotch panel (56) positioned between the front waist panel (52) and the back waist panel (54).

The absorbent material region (62) may comprise an absorbent layer and an acquisition layer. The absorbent layer is the region wherein absorbent materials having a high retention capacity, such as superabsorbent polymers, are present. The absorbent layer may be substantially cellulose free. Superabsorbent polymers of the absorbent layer may be disposed between first and second layers of material immobilized by a fibrous layer of thermoplastic adhesive material. The first and second layers of materials may be nonwoven fibrous webs including synthetic fibers, such as mono-constituent fibers of PE, PET and PP, multiconstituent fibers such as side by side, core/sheath or island in the sea type fibers. Such synthetic fibers may be formed via a spunbonding process or a meltblowing process. The acquisition layer facilitates the acquisition and the distribution of body exudates and may be placed between the topsheet and the absorbent layer. The acquisition layer may include cellulosic fibers.

The absorbent layers may be disposed in plurality in the absorbent material region (62). Some portions of the absorbent layers may be configured to have substantially no absorbent material to form a channel or a plurality of channels. Channels may be useful for allowing the absorbent material region (62) to bend upon swelling with fluids, such that the absorbent article conforms to the wearer's body after swelling and prevent sagging of the article. The channels may also be formed in the acquisition layer, and may be configured to at least partly match the channels of the absorbent layer in the thickness direction.

Referring to FIG. 1, the absorbent main body (38) may comprise leg cuffs (64) made of material having high fluid impermeability, and elasticized to provide a barrier along both transverse edges of the absorbent main body (38). Such leg cuffs (64) may be attached to the remainder of the absorbent main body by bonding them to the topsheet at both longitudinal edges of the absorbent main body (38), such that at least in the crotch region (30), the leg cuffs are in active elasticity to provide gasketing around the leg openings.

The elastic belt (40) of the article of the present invention acts to dynamically create fitment forces and to distribute the forces dynamically generated during wear. The front and back elastic belts (84, 86) may be joined with each other only at the side edges (89) to form side seams (32), a waist opening and two leg openings. Each leg opening may be provided with elasticity around the perimeter of the leg opening. The elasticity around the leg opening may be provided by the combination of elasticity from the front elastic belt (84), the back elastic belt (86), and the leg cuffs (64).

The longitudinal length of the backsheet and the outer cover layer (42) may be the same, or may be varied. For example, the outer cover layer (42) may have a shorter length compared to that of the backsheet, such that the outer cover layer (42) is devoid where the absorbent main body (38) overlaps the elastic belt (40). By such configuration, the elastic belt may have better breathability. Further, such configuration may provide cost saving. The transverse width of the backsheet and the outer cover layer (42) may be the same, or may be varied. For example, the backsheet may have a shorter transverse width compared to that of the outer cover layer (42). By such configuration, the longitudinal side edges (48) of the crotch panel (56), which make part of the leg openings, may have better breathability. Further, such configuration may provide cost saving.

For the belt-type pant, the longitudinal length LB of the back elastic belt (86) and the longitudinal length LF of the front elastic belt (84) may be provided the same, or the back elastic belt (86) may have a greater longitudinal length LB as in FIG. 2A. Referring to FIG. 2A, when the wearable article is assembled to form the waist opening and the leg openings, the wearable article (20) is folded along the transverse centerline T1 such that the front distal edge (88) is aligned with the back distal edge (88). The front side edge (89) is also aligned with a portion of the back side edge (89). Then the front elastic belt (84) and the back elastic belt (86) are joined at the front and back side edges (89) at the seams (32). The front and back proximal edges (90), however, may not be aligned to one another. The back proximal edge (90) may be disposed longitudinally closer than the front proximal edge (90) relative to the transverse center line T1 such that the proximal portion of the back side panel (82) extends toward the crotch panel (56) of the main body (38) beyond the front proximal edge (90). The side edge of the proximal portion of the back side panel (82) may not be joined to anywhere and free from attachment. Thus, the proximal portion of the back side panel (82) provides a buttock cover (95) (not shown).

The front elastic belt (84) and back elastic belt (86) are configured to impart elasticity to the belt (40). Referring to FIGS. 1, 2A, and 3D, the front elastic belt (84) and the back elastic belt (86) may each comprise a laminate, the laminate comprising a plurality of elastic members (96F, 96S) running in the transverse direction, an inner sheet (94), an outer sheet (92), and one or a plurality of outer sheet fold overs (931, 932) wherein the outer sheet fold over is an extension of the outer sheet material formed by folding the outer sheet material at the distal edge (88) of the front and back elastic belts or otherwise; wherein the belt elastic members (96F, 96S) are sandwiched between two of these sheets. The front elastic belt (84) and the back elastic belt (86) may each be made only by elastic members (96S), the inner sheet (94), the outer sheet (92), and the outer sheet fold overs (931, 932). The belt elastic members (96F, 96S) may extend in the transverse direction to provide a ring like elastic belt (40) when the front elastic belt (84) and the back elastic belt (86) are joined. At least some of the elastic members (96F, 96S) extend in the transverse direction substantially parallel to each other. All of the elastic members (96F, 96S) may extend in the transverse direction substantially parallel to each other. Such an article may be economically made. The front and back elastic belt (84, 86) each may have transversely continuous proximal and distal edges, the proximal edge (90) being located closer than the distal edge (88) relative to the longitudinal center of the article. At least 10%, or at least from about 15% to not more than about 70%, of the front and back elastic belts from the waist opening in the longitudinal direction may be a laminate in active elasticity along the entire transverse dimension LW of the front and back elastic belts (84, 86). For each front and back elastic belt (84, 86), the region overlapping the front and/or back waist panel (52, 54) of the absorbent main body (38) may be removed of its elastic activity. Such region removed of elastic activity is referred herein as the "elastic cut window", and the remainder of the intact elastic member capable of imparting elasticity is defined as the "effective length of elasticity of an elastic member".

The tensile stress (N/m) of the entirety of the front and back elastic belts (84, 86), respectively, may be profiled in order to provide the functional benefits of the present invention, such as ease of stretch and application, while also maintaining certain force during wear, to prevent the article from sagging after loading. When the elasticity of the front and back elastic belts (84, 86) are provided by a plurality of elastic members (96F, 96S) running in the transverse direction, the tensile stress may be adjusted by one or more of the following methods; 1) elongation rate of the elastic member (96F, 96S); 2) density (dtex) of the elastic member (96F, 96S); 3) longitudinal pitch of multiple elastic members (96F, 96S); and 4) effective length of elasticity of the elastic member (96F, 96S) in the transverse direction. By elongation, "0% elongation" is meant the original length of the elastic member.

Referring to FIGS. 2A and 2B, the front and back elastic belts (84, 86) may each be divided into multiple zones spanning in the transverse direction and defined by its location from the distal edge (88) to the proximal edge (90) relative to the percentage of the seam length LS wherein the distal edge (88) is considered 0% and the proximal edge (90) is considered 100%. The multiple zones may be configured to provide different tensile stress, or different functions to the front and back elastic belts (84, 86), respectively. In the absorbent article of the present invention, a waist guard portion WGP is disposed within a location of 25-60% of LS on one or both of the front and back elastic belts (84, 86), the waist guard portion WGP extending towards the crotch region from a closed base line (103B) toward an open edge (103M), wherein the waist guard portion WGP is partially bonded to the remainder of the front or back elastic belt (84, 86) to define a pocket (103P). FIG. 1 depicts a waist guard portion WGP on the back elastic belt. The waist guard portion WGP need not span the entire 25% to 60% of LS, but rather is comprised within such dimension. The waist guard portion WGP may be positioned at a dimension of from about 25% to about 50% of LS, or from about 30% to about 60% of LS, or from about 25% to about 55% of LS, or from about 30% to about 50% of LS. Without being bound by theory, by providing the waist guard portion WGP in such dimension on the back elastic belt (86), the buttock cleavage of a wearer is effectively covered by the waist guard portion WGP so that low viscosity exudate, such as runny fecal matter or blood, may be effectively drawn into the pocket. Without being bound by theory, by providing the waist guard portion WGP in such dimension on the front elastic belt (84), the area matching the pubic bone of a wearer is effectively covered by the waist guard portion WGP, so that low viscosity exudate, such as urine, may be effectively drawn into the pocket.

Referring to FIGS. 2B, 2C, and 3A-3D, the waist guard portion WGP is explained by utilizing an embodiment provided on the back elastic belt (86). The waist guard portion WGP is made by an extension of the outer sheet (92) extending beyond the longitudinal dimension of the inner sheet (94), which extension of the outer sheet (92) is folded inwardly 2 times in order to encompass a first elastic member (96F) and further to provide the waist guard portion WGP in the intended position relative to the side seam length LS. As a result of the 2 folds, the first elastic member (96F) is sandwiched between the first outer sheet fold (931) and the second outer sheet fold (932), wherein the first outer sheet fold (931) constitutes the garment facing side of the waist guard portion WGP, and the second outer sheet fold (932) constitutes the body facing surface. Referring to FIGS. 2C and 3D, a certain longitudinal dimension from the distal edge of the second outer sheet fold (932) is bonded to the remainder of the belt, such bonding shown as SWFA, however, leaving some longitudinal dimension unbonded. The position provided most distal of the unbonded region is the closed base line (103B), and the common proximal edge of the first outer sheet fold (931) and second outer sheet fold (932) is the open edge (103M). The waist guard portion WGP is defined as having a longitudinal dimension spanning from the closed base line (103B) and the open edge (103M), and having a transverse dimension matching the width of the belt to which it is provided. The left and right transverse edges of the waist guard portion WGP are also bonded to the remainder of the belt, such bonding shown as SWFA. The unbonded region thus provided is the pocket (103P). The bondings provided to define the area of the pocket (103P) are so configured to provide the pocket (103P) substantially superposing the backsheet, preferably completely superposing the backsheet. Without being bound by theory, by providing the pocket (103P) substantially superposing the backsheet, this prevents low viscosity exudate having entered the pocket (103P) from flowing or penetrating out of the pocket (103P) towards the waist opening, or the transverse edges.

Referring to FIG. 2B, the first elastic member (96F) provides the waist guard elastic portion WGEP, wherein elasticity may be imparted by one or more elastic strands, elastic ribbons, mechanically activated nonwovens, or otherwise. The waist guard elastic portion WGEP is defined as having a longitudinal dimension (1031) spanning from the open edge (103M) to the distal edge of the first elastic member (96F). When the first elastic member (96F) is a plurality of elastic strands, the distal edge of the waist guard elastic portion WGEP is the position of the elastic strand which is positioned most distal. There may be 2-10 elastic strands, or from 2-5 elastic strands, or 2-8 elastic strands, or 3-4 elastic strands, or 3-8 elastic strands, or 4-6 elastic strands disposed on the waist guard elastic portion. The longitudinal dimension of the waist guard elastic portion WGEP is smaller than that of the waist guard portion WGP such that a pocket (103P) having containment capacity may be provided. The longitudinal dimension of the waist guard elastic portion WGEP may be no greater than about 40 mm, or no greater than about 35 mm, or no greater than about 30 mm, or no greater than about 25 mm, or from 15 mm to about 40 mm, or from about 10 mm to about 35 mm, or from about 10 mm to about 25 mm. In FIGS. 2B and 2C, the pocket (103P) has a rectangular shape, however, the pocket (103P) may take other shapes by changing the bonding area SWFA such that the closed base line (103B) is shaped. For example, the closed base line (103B) may be concave or convex toward the pocket (103B) to match the wearer's anatomy. The longitudinal dimension of the pocket (103P) defined as the shortest distance between the closed base line (103B) to the open edge (103M) may be from about 20 mm to about 45 mm, or from about 24 mm to about 42 mm.

Referring to FIGS. 2B and 3D, the remainder of the belt superposing the waist guard elastic portion WGEP is defined a correlated portion CP. Namely, the correlated portion CP has the same longitudinal dimension (1031) as the waist guard elastic portion WGEP. The correlated portion CP may be elasticized or may not be elasiticized, wherein the tensile stress of the waist guard elastic portion WGEP is higher than that of the correlated portion CP. The correlated portion CP may be elasticized wherein the tensile stress of the waist guard elastic portion WGEP is at least about 25% higher, or at least about 100% higher than that of the correlated portion CP. Without being bound by theory, such tensile stress difference enables the waist guard elastic portion WGEP to be in close contact with the wearer, while pulling away the open edge (103M) from the correlated portion CP, thus opening the pocket (103P) towards the proximal side. Thus, the pocket (103P) is configured to have good containment capacity. The correlated portion CP may have an elastic cut window such that some portion is elasticized, while the transverse center does not interfere with the opening of the pocket (103P). When the waist guard elastic portion WGEP is elasticized by disposing a plurality of elastic strands (96F), one elastic strand is disposed from no less than 2 mm to 5 mm away from the open edge (103M). Placement of the elastic strand on the very edge of the open edge (103M) may be avoided in order to prevent the waist guard position WGP causing irritation to the wearer. The waist guard elastic portion WGEP may be disposed with a plurality of elastic strands (96F) with a relatively small pitch between each other. The elastic strands (96F) of the waist guard elastic portion WGEP may be disposed at a pitch of no more than about 12 mm, or no more than about 10 mm, or no more than about 6 mm, or between about 2 mm to about 8 mm, or between about 3 mm to about 9 mm, or between about 2 mm to about 6 mm.

The elastic strands (96F) for providing the waist guard elastic portion WGEP may be provided in color such that the existence and function of the waist guard portion WGP is clearly communicated to the wearer or caregiver. At least 2 of the elastic strands for providing the waist guard elastic portion WGEP may have a color which is visible from the body facing side of the article. The color may be selected from green, blue, purple, or a combination thereof, in order to be easily recognized, while not being confused with the color of containment. The same or similar color may be used for other elastic strands (96S) disposed on the belt to provide a coordinated appearance. For example, those elastic strands on the front waist zone (102) or the back waist zone (102) may have the same or similar color.

The waist guard portion WGP may be configured in a certain way relative to the absorbent main body to provide improved function. As mentioned above, the area of the pocket (103P) are so configured to provide the pocket (103P) substantially superposing the backsheet, preferably completely superposing the backsheet. Referring to FIGS. 2C and 3D, the longitudinal edges of the absorbent main body (38) may be positioned and bonded between the waist guard portion WGP and the remainder of the belt. This is to avoid having sharp edges of the absorbent main body (38) on the body facing surface, and also to avoid leakage from the edges. The absorbent main body (38) comprises an absorbent material region (62) which may be surrounded by an absorbent material non-existing region (61), wherein the absorbent material region (62) having a greater thickness than that of the absorbent material non-existing region (61). The absorbent material region (62) may partially superpose the area of the pocket (103P) to provide at least some absorbent capacity in this region. At least about 3%, or at least about 10% of the area of the pocket (103P) may superpose the absorbent material region (62) toward the proximal edge. Even so, the combined thickness of the waist guard elastic portion WGEP, the correlated portion CP, and the portion of the absorbent main body (38) sandwiched therebetween may be kept to no more than about 5 mm, preferably no more than about 4 mm. This is so that the thickness of the remainder of the article does not interfere with the opening of the pocket (103P) towards the proximal side due to the elasticity of the waist guard elastic portion WGEP. When the absorbent main body (38) comprises an acquisition system, the acquisition system may be avoided from superposing the pocket (103P). In order to provide the waist guard portion WGP relative to the absorbent main body (38) in the aforementioned way, the distance between the waist opening to the longitudinal edge of the absorbent main body (38) may be adjusted, namely may be shifted toward the back side or the front side. For example, when the waist guard portion WGP is provided only on the back elastic belt (86), the distance between the waist opening to the longitudinal edge of the absorbent main body (38) may be made shorter on the back side than the front side.

The belt on which the waist guard portion WGP is disposed may be divided into 3 zones spanning in the transverse direction and defined by its location from the distal edge (88) to the proximal edge (90) relative to the percentage of the seam length LS wherein; 0% to the distal edge of the waist guard portion WGP is a waist zone (102), and the distal edge to the proximal edge of the waist guard portion WGP is a protective zone (103), and the proximal edge of the waist guard portion WGP to 100% is another zone. When there is an elastic member disposed at the distal edge or the proximal edge of the protective zone (103), such elastic member is considered to be included in the protective zone (103). Elastic members may be disposed on the remainder of the protective zone (103) which superposes the unelasticized area of the waist guard portion WGP. Regardless of the existence of the waist guard portion WGP, elastic members may be disposed on each of the waist zone (102), the protective zone (103) other than the waist guard portion WGP, and another zone.

The waist guard portion WGP may be configured in a certain way relative to a pair of leg cuffs (64) disposed along both transverse edges of the absorbent main body (38), to provide improved function. For the belt comprising the waist guard portion WGP, the leg cuffs (64) may be in active elasticity at the point intersecting the open edge (103M). By providing the leg cuffs in active elasticity in such position, the combined elasticity from the leg cuffs and waist guard elastic portion WGEP may help hold the leg cuffs (64) and waist guard portion WGP in close contact with the wearer, and further provide additional containment capacity for the pocket (103P).

Referring to FIGS. 2A and 2B, when the waist guard portion WGP is disposed on the back elastic belt (86), the back elastic belt (86) may be divided into 3 zones spanning in the transverse direction and defined by its location from the distal edge (88) to the proximal edge (90) relative to the percentage of the seam length LS wherein; 0% to the distal edge of the waist guard portion WGP is a back waist zone (102), the distal edge to the proximal edge of the waist guard portion WGP is a protective zone (103), and the proximal edge of the waist guard portion WGP to 100% is a buttock zone (105). The back elastic belt may further have a buttock cover zone (110), wherein the longitudinal dimension of the back elastic belt LB exceeds LS. Elastic members may be disposed on each of the waist zone (102), the protective zone (103) other than the waist guard portion WGP, the buttock zone (105), and the buttock cover zone (110).

When the waist guard portion WGP is not disposed on the front elastic belt, the front elastic belt may be divided into 4 zones wherein: 0-25% is the waist zone (102), 25-50% is the distal tummy zone (104), 50-85% is the proximal tummy zone (106), and 85-100% is the leg zone (108). When there is an elastic member disposed at 25% from the distal edge (88), such elastic member is considered to be included in the waist zone (102). When there is an elastic member disposed at 50% from the distal edge (88), or 85% from the distal edge (88), such elastic member is considered to be included in the proximal tummy zone (106).

Figure 4:
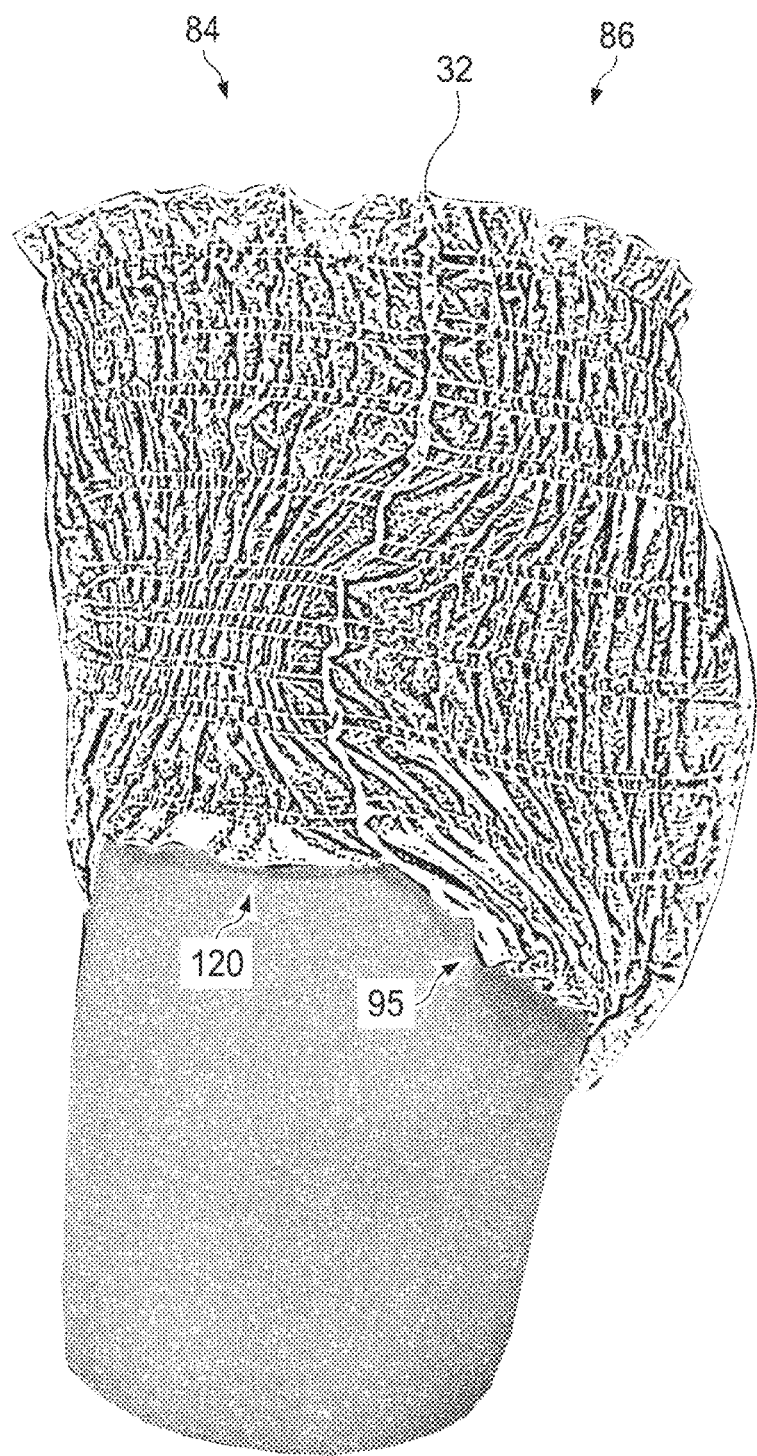
FIG. 4 is a side view of one embodiment of an absorbent article of the present invention worn on a mannequin.

When the waist guard portion WGP is disposed on the back elastic belt and not disposed on the front elastic belt, the tensile stress of the protective zone (103) may be provided higher than the tensile stress of either the back waist zone (102), or the buttock zone (105). When the waist guard portion WGP is disposed on the back elastic belt and not disposed on the front elastic belt, the tensile stress of the front proximal tummy zone (106) may be provided higher than the tensile stress of any of the front waist zone (102), the front distal tummy zone (104), or the front leg zone (108). The tensile stress of the front proximal tummy zone (106) may be higher than the tensile stress of any other zone, either in the front or the back. When comparing all of the zones of the front elastic belt and the back elastic belt, the tensile stress may be provided greatest in the order of: the front proximal tummy zone (106), followed by the protective zone (103). Without being bound by theory, such profiling of the tensile stress per zone is believed to provide the article of the present invention with a shaped elastic belt (40) that conforms well to a human body, such as in FIG. 4, particularly to a lower torso of a child of less than 36 months of age, and therefore provide good fit and comfort to the wearer, without compromise of sagging prevention or leakage prevention. Namely, the front proximal tummy zone (106) is subject to high tensile stress such that the article may be anchored against the wearer's trochanter, while leaving more area for the buttock zone (105) to accommodate the wearer's buttock.

Referring to FIGS. 3A-3D, the elastic belts of the present invention may be made by a relatively simple structure comprising no more than the inner sheet (94), the outer sheet (92), the first outer sheet fold (931), the second outer sheet fold (932), and the first and second elastic members (96F, 96S) encompassed within these layers. Any portion of the elastic belt comprising the waist guard portion WGP may be made by less than 6 layers, or made by 3-4 layers, and in a thickness of no more than about 5 mm, or no more than about 4 mm. Providing the belt structure simple and relatively thin is advantageous in maintaining breathability and softness of the belt. Further, the elastic belts may be made by elastic strands commonly used in the art having a density of no more than 940 dtex. Certain zones of the belt may be disposed of elastic bodies having a density of no more than about 500 dtex, thus providing a soft fit. Elastic bodies having a density of no more than about 500 dtex may be disposed on one or more of the waist zone (102) or the front leg zone (108). Without being bound by theory, it is believed that elastic bodies of relatively low density impart an easy initial stretch experience when stretch opening the article (20), while maintaining a good fit during wear. The article of the present invention may be provided with a protective measure for preventing leakage of low viscosity bodily exudates from the waist opening, while maintaining good stretchability for ease of application, good fit for preventing sagging, good comfort and softness, and good breathability. The present article may have a Waist Circumference Force according to the Whole Article Force Measurement herein of no more than about 9N, or no more than about 8N.

In the present invention, at least one of the inner sheet (92), the outer sheet (94), or the outer cover layer (42) may further comprise a plurality of apertures, wherein the individual aperture may be in the shape of an oval, or polyhedron, while having an aspect ratio of no more than about 3, or no more than about 2.5. The individual aperture may have a transverse dimension APT of at least about 0.4 mm, or from about 0.4 mm to about 2.0 mm, and a longitudinal dimension APL, wherein APT is at least about 10% greater than APL. Further, the individual apertures may be spaced apart from each other with a longitudinal pitch DF2 of no more than about 5 mm, and APL is not larger than 50% of DF2, or APL is from about 12% to about 30% of DF2. Apertures of such size, shape, and spacing may be visible to the naked eye on the garment-facing surface. When apertures are provided on the outer sheet (92), this may connote breathability and high quality of the gathers made by the contraction of the elastic members of the elastic belt (40), even when the gathers are in contracted state. By providing apertures on the outer sheet (92) and the outer cover layer (42) and further coordinating the patterns of apertures, this may enhance integral appearance of the elastic belt (40) and absorbent main body (38).

Referring to FIGS. 1, 2A, and 3D, even when the back elastic belt (86) comprises a waist guard portion WGP, the remainder of the back elastic belt (86), and particularly the garment facing surface of the back elastic belt (86), may be maintained in a simple structure. This enables the article to have other functions that are desired of a pant type absorbent article, such as having a disposal tape attached to the garment facing surface of the back elastic belt (86). Accordingly, the absorbent article may be devoid of fastening means.

Referring to FIGS. 3A-3D, the steps for making the absorbent article of the present invention is explained, utilizing an embodiment wherein the back elastic belt (86) comprises the waist guard portion WGP. While only the back belt is shown in FIGS. 3A-3D, the waist guard portion WGP may be made in the same way on the front elastic belt (84). Further, the front and back elastic belts may be formed from the same continuous first and second sheets (94C, 92C). The elastic belts of the present invention may be made by a process comprising the steps of providing 2 folds for the outer sheet (92) and keeping the elastic belt (40) soft and relatively thin. The process comprises introducing elastic strands (96F) for the waist guard elastic portion WGEP by the first fold (931), configuring the waist guard portion WGP by the second fold (932), and configuring a pocket (103P) by bonding certain portions of the first and second fold (931, 932) to the remainder of the back elastic belt (84) or the back waist panel (54, 38). The main differences compared to methods for making articles devoid of the waist guard portion WGP include; providing the outer sheet (92) in longer longitudinal dimension of the article, or wider dimension in the CD direction, and having an additional step of providing 2 folds of the outer sheet (92), rather than 1 fold. Such differences may be effected conveniently by changing the upstream of currently available methods for making a pant-type article. This enables change over of making the absorbent article of the present invention from those devoid of the waist guard portion WGP relatively easy. The manufacturing method of the present invention is described in further detail below.

Figure 5:
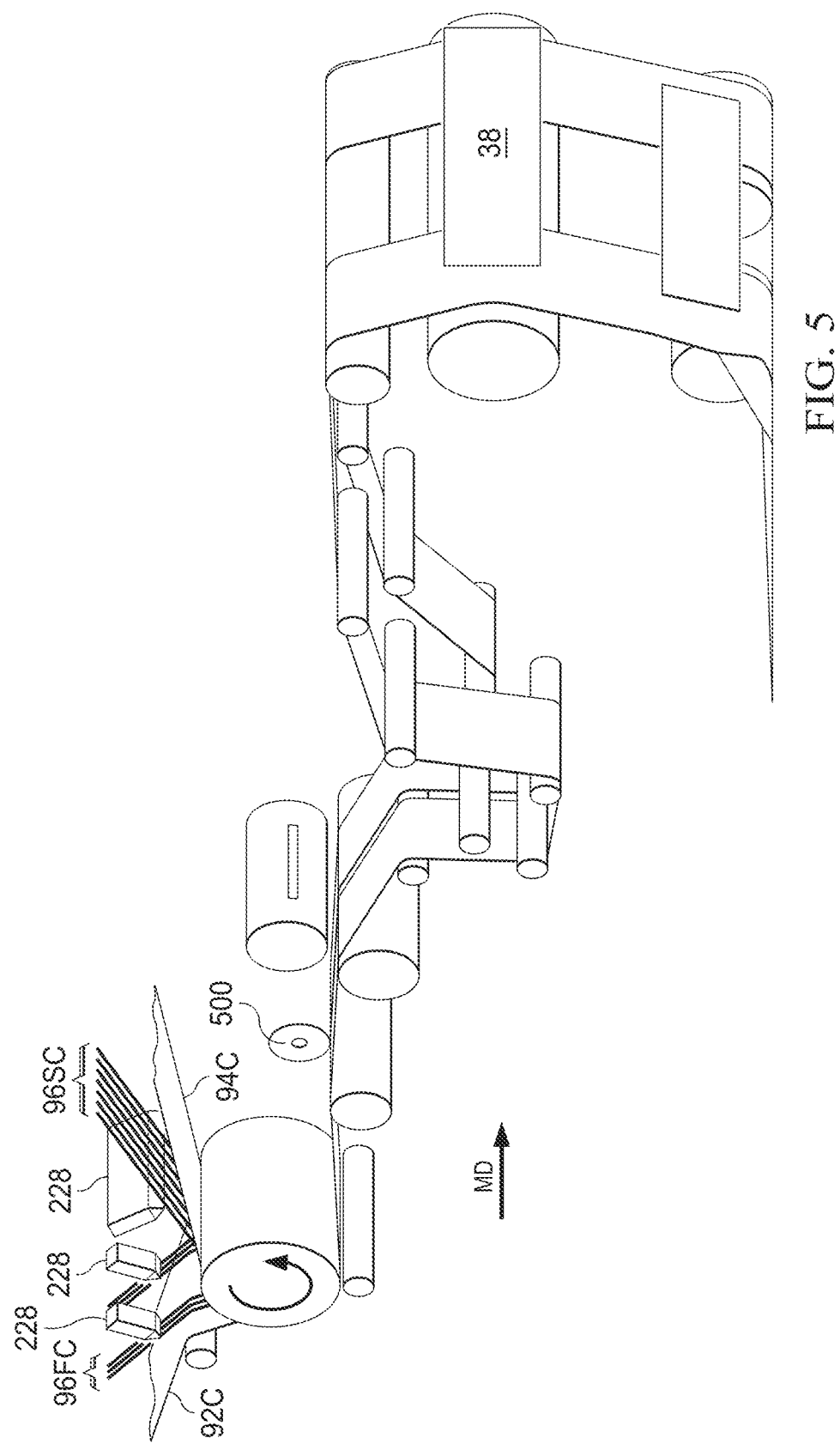
FIG. 5 is a schematic view of the process of the present invention.
Figure 6:
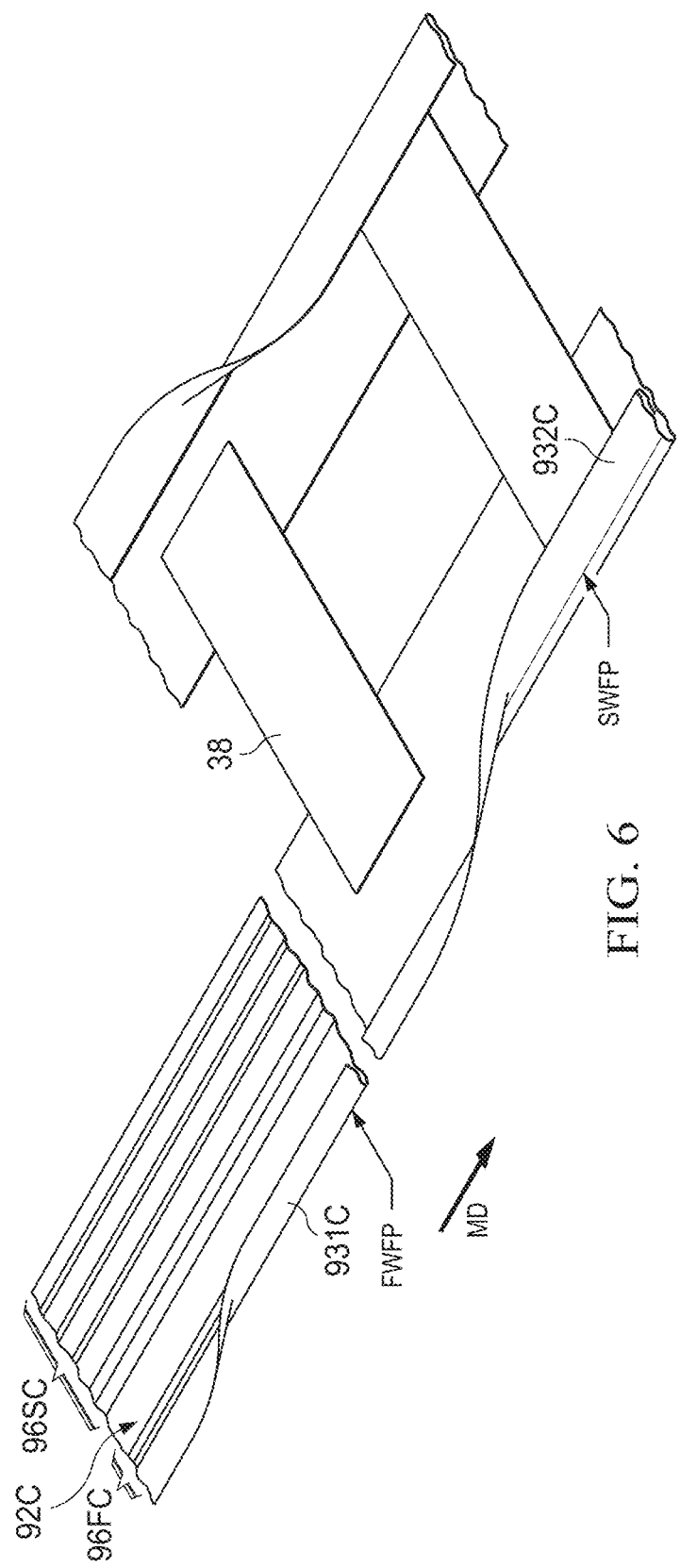
FIG. 6 is a schematic view of the folding steps of the present invention.

Referring to FIG. 5, the present method is directed to providing a waist guard portion WGP to at least one of the front elastic belt (84) or the back elastic belt (86) by minor additions and modifications to currently available methods for making a pant-type absorbent article. FIG. 5 specifically describes a method for making a belt-type pant. Namely, referring to FIGS. 6 and 3A-3D, an additional first folding step is added to the upper flow of the process. The first folding step as in FIGS. 3A-3B introduces the first elastic strands (96F), and a second folding step as in FIGS. 3C-3D configures the waist guard portion WGP. The method enables using the same number of elastic strands for the belt, compared to products devoid of the waist guard portion WGP, while also enabling manufacture at a similar line speed. The line speed may be at least about 200 meters per minute, or at least about 250 meters per minute, or at least about 300 meters per minute, or at least about 350 meters per minute, or at least about 400 meters per minute.

In the finished article, the first layer of continuous sheet (92C) becomes the outer sheet (92), the second layer of continuous sheet (94C) becomes the inner sheet (94), the first elastic bodies (96FC) become the elastic bodies for the waist guard elastic portion WGEP (96F), the second elastic bodies (96SC) become the remaining elastic bodies (96S), and the pocket (103P) is formed by the unbonded portions of the first and second folds (931C, 932C).

The present method comprises the following 4 steps.

A) Forming a Waist Guard Precursor

Referring to FIGS. 3A, 3B, 5 and 6, this step comprises advancing a first layer of continuous sheet (92C) having an inner surface and an opposing outer surface in a machine (MD) direction and defining a width in a cross machine (CD) direction;

advancing a second layer of continuous sheet (94C) having an inner surface and an opposing outer surface in the machine direction and having a smaller width than the first layer of continuous sheet; advancing a plurality of first elastic members (96FC) in the machine direction in a stretched state; bonding the first elastic members (96FC) on the inner surface of the first layer (92C); folding the width edge of the first layer (92C) along the machine direction at a first waist fold point (FWFP) to form a first waist fold (931C);

bonding the first elastic members (96FC) between the inner surface of the first layer (92C) and the first waist fold (931C) to form a waist guard precursor WGPP.

The first waist fold (931C) is made by folding the first layer at the first waist fold point FWFP. The first elastic members (96FC) may be secured within the waist guard precursor WGPP by a first waist fold adhesive FWFA provided on the first continuous sheet (92C) in a region between the continuous first elastic members (96FC) and the continuous second elastic members (96SC). The continuous first elastic members (96FC) may also be applied adhesive (228) prior to bonding to the first continuous sheet (92C). The first elastic members (96FC) may be bonded to either or both layers of the first continuous sheet (92C) by adhesive continuously, or intermittently. When the first elastic members (96FC) are bonded intermittently, the bonding pattern may be so arranged that the bonding only exists along the side seams per article.

B) Entering the Other Elastic Members of the Belt

Referring to FIGS. 3A and 5, this step comprises advancing a plurality of second elastic members (96CS) in the machine direction in a stretched state;

bonding the second elastic members (96CS) to the inner surface of the first layer (92C);

bonding the inner surface of the second layer (94C) to the inner surface of the first layer (92C) in order to sandwich the second elastic members (96CS).

Referring to FIG. 5, the continuous second elastic members (96SC) may also be applied adhesive (228) prior to bonding between the first and second continuous sheets (92C, 94C). The second elastic members (96SC) may be bonded to either or both layers of the first continuous sheet (92C) continuously, or intermittently. When the second elastic members (96SC) are bonded intermittently, the bonding pattern may be so arranged that the bonding only exists along the side seams per article.

While not illustrated, there may be provided vertical adhesive to the first and/or second continuous sheets (92C, 94C) in continuous or discontinuous lines in the CD direction and spaced apart in the MD direction. Such vertical adhesive may be utilized for intermittently bonding the first and second elastic members (96SC).

Steps A) and B) may be effected substantially simultaneously in order to reduce exposure time of any adhesives utilized during the steps. Steps A) and B) may be effected substantially simultaneously for making both the front and back elastic belts (84, 86). Further, depending on whether or not elastic cut windows are desired for the elastic members (96FC, 96SC), the elastic members (96FC, 96SC) may be grouped prior to joining with the first and second continuous sheets (92C, 94C). As explained above, certain elastic members (96SC) may have an elastic cut window to remove elastic activity over a certain length in the region overlapping the front and/or back waist panel (52, 54). Such elastic cut window is made by leaving the elastic member unbonded to the first or second continuous sheets (92C, 94C) and severing the elastic member. When the bonding is provided by applying adhesive, it may be convenient to group the elastic members into those which have an elastic cut window and those that do not. Those elastic members that do not have an elastic cut window may be applied adhesive over the entire length per article of the elastic members, while those elastic members that have an elastic cut window may be applied adhesive intermittently. In one embodiment, the first elastic members (96FC) and elastic members to be eventually continuously bonded along the waist opening (96SC) may be introduced in one group with continuous adhesive application, while the remainder elastic members to have an elastic cut window (96SC) may be introduced in another group with intermittent adhesive application.

C) Referring to FIGS. 3C and 5, this step comprises bonding the absorbent main body (38) to the outer surface of the second layer (94C). Chassis to belt adhesive CTBA may be applied to the outer surface of the second layer (94C) for this bonding. While not illustrated, the chassis to belt adhesive CTBA may be provided in stripes continuous in the MD direction and spaced apart in the CD direction.

Preceding Step C), referring to FIG. 5, when the absorbent article is a belt-type pant, the jointly created front and back elastic belt assembly may be separated by a slit cutter (500) while the absorbent main body (38) may be formed by cutting a continuous absorbent main body into discrete pieces, and processing through a transferring apparatus to turn the absorbent main body (38) into a second position while spacing the absorbent main body (38) as appropriate, and transferred to be joined such that the transverse axis of the absorbent main body (38) is aligned with the MD direction of the elastic belt making assembly.

D) Forming a Waist Guard Portion

Referring to FIGS. 2C, 3C, 3D, 5, and 6, this step comprises;

folding the assembly thus obtained along the machine direction at a second waist folding point SWFP between the second waist fold (932) waist guard precursor WGPP and the width edge of the second layer (94C) to wherein a portion of the absorbent main body (38) is sandwiched between proximal edge of the second waist fold (932) and the outer surface of the second layer (94C); and bonding a certain portion of the first waist fold (931) and a certain portion of the second waist fold (932) to the remainder of the assembly to which it faces, wherein the first waist fold (931) and the second waist fold (932) left unbonded forms a pocket (103P). For this bonding, a second waist fold adhesive SWFA may be applied to the first waist fold (931) as well as the inner surface of the first continuous sheet (92C) which is planned to become the second waist fold (932). Referring to FIG. 2C, the second waist fold adhesive SWFA is so applied that there is an opening in the transverse center of the obtained article. Referring to FIG. 2C, the second waist fold adhesive SWFA may be applied so that the obtained article is bonded over the entire dotted area, or may be provided in stripes or spirals, or other shapes which cover the dotted area in enough bonding to bear any detachment during usage, and to avoid contained exudate penetrating outside the pocket.

Steps C) and D) may be effected substantially simultaneously in order to reduce exposure time of any adhesives utilized during the steps.

The obtained assembly after Step D) is then folded at the middle point in the CD direction to obtain a final continuous assembly (400). The final continuous assembly (400) is then seamed at the planned left and right edges of the article, and then finally cut to obtain individual absorbent articles.

Referring to FIG. 3D, the either elastic belt (84, 86) comprising the waist guard portion WGP may be provided in 3-4 layers of belt forming sheets in the thickness direction, namely no more than the total of the outer sheet (92), the inner sheet (94), the first waist fold over (931) and the second waist fold over (932). Accordingly, the absorbent article of the present invention may have portions along the side seam (32) in a gradation of 4 to 8 layers. For seaming such side seam with varying number of layers, the side seaming process described in one of FIGS. 7A-7C may be advantageous, and discussed in detail below.

Side seaming may be provided by directing a jet of heated air to the final continuous assembly (400) in order to at least partially melt the substrates of the continuous front elastic belt and the substrates of the continuous back elastic belt, and then compressing the melted portion between an outer circumferential surface of an anvil roll (368) and a pressing member (380). The compressing may comprise a first compression and a second compression, wherein the region of compressing of the first compression and second compression may vary over the longitudinal dimension of the side seam.

Figure 7A:
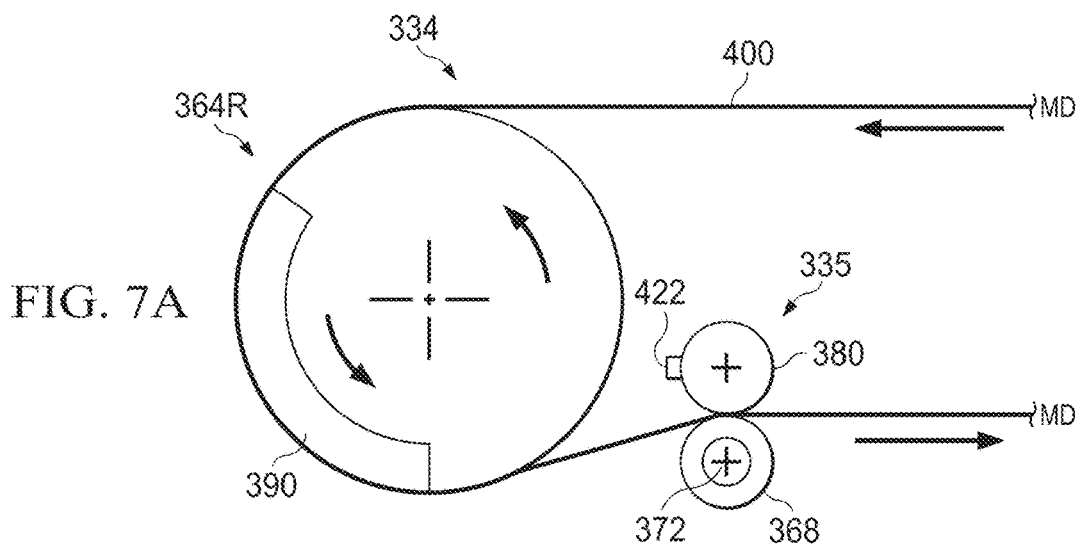
FIG. 7A-7C are schematic views of the bonder modules for the process of the present invention.

For example, FIG. 7A shows a schematic side view of a first embodiment of a bonder module (334) that may be utilized with the methods and apparatuses herein. As shown in FIG. 7A, the bonder module (334) may include a seaming drum (364R) and a compressing stage (335) located adjacent the seaming drum (364R). The assembly may be rotated about the seaming drum (364R) in order to provide sufficient time for the melting, such that the melted portion may be compressed to provide the side seam (32) of the resulting article to have continuity of melted material along the substantial entirety of its longitudinal dimension. Hot air nozzles may be actively directing heated air only in the active regions (390) of the seaming drum (364R). The compressing stage (335) may be located shortly after leaving the seaming drum (364R). The compressing stage (335) may comprise one set of an anvil roll (368) and a pressing member (380) that engage with each other. The anvil roll (368) includes an outer circumferential surface and is adapted to rotate about an axis of rotation (372). The pressing member (380) may comprise a pair or projections (422) for engaging with the outer circumferential surface for forming a pair of side seams adjacent each other. By providing a compression stage (335) independent of the seaming drum (364R), the anvil roll (368) and the pressing member (380) may each be adjusted according to the type of assembly to seam. This is advantageous in that assemblies made of various types of substrates and various sizes may be seamed without the need to fabricate the seaming drum (364R). The outer circumferential surface of the anvil roll (368) and the projection (422) of the pressing member (380) to engage with the outer circumferential surface may have configurations for providing varying bonding pressure.

Figure 7B:
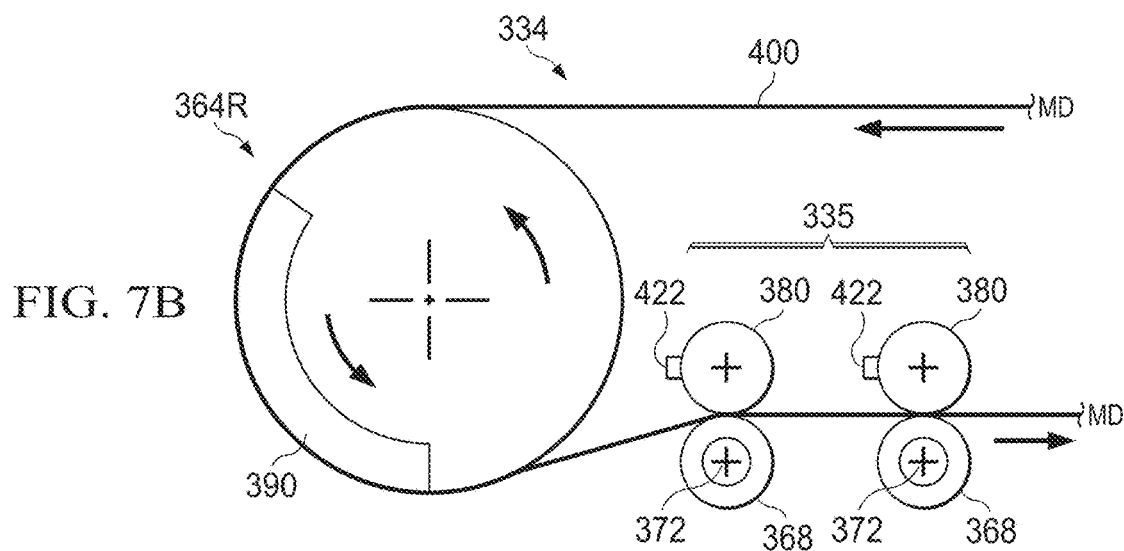
Figure 7C:
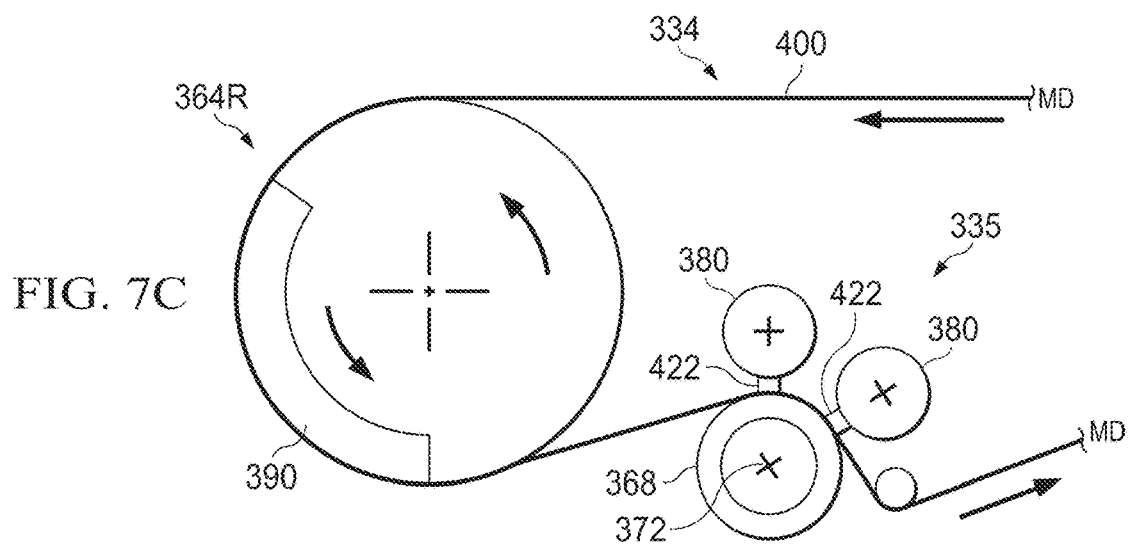

In other examples, FIGS. 7B and 7C show schematic side views of a second embodiment and a third embodiment, respectively, of a bonder module (334). Similar to the first embodiment, the second and third embodiments shown in FIGS. 7B and 7C may include a similar seaming drum (364R), while having a compression stage (335) of different configuration. Referring to FIG. 7B, the compressing stage (335) may be located shortly after leaving the seaming drum (364R), and the compressing stage (335) may comprise two sets of engaging anvil rolls (368) and pressing members (380). Referring to FIG. 7C, the compressing stage (335) may be located shortly after leaving the seaming drum (364R), and the compressing stage (335) may comprise one anvil roll (368) which engages with two pressing members (380). By providing a compression stage (335) independent of the seaming drum (364R) and further with more than one compression site, the multiple compression sites in FIGS. 7B and 7C may be configured to press against different portions of the assembly that may have different caliper or layers of nonwovens, and/or press against some portions more than once. This is also advantageous in that assemblies made of various types of substrates and various sizes may be seamed by changing one or more of the anvil rolls (368) and pressing members (380) without the need to fabricate the seaming drum (364R). The outer circumferential surface of the anvil roll (368) and the projection (422) of the pressing member (380) to engage with the outer circumferential surface may have configurations for providing varying bonding pressure.

Whole Article Force Measurement

Force is measured using an Electronic Tensile Tester with a computer interface such as the MTS Criterion C42 running TestWorks 4 Software (available from MTS SYSTEMS (CHINA) CO., LTD) or equivalent instrument. A load cell is selected so that force results for the samples tested will be between 10 and 90% of capacity of the load cell used. The instrument is calibrated according to the manufacturer's instructions. All testing is performed in a room maintained at 23±2° C. and 50±5% relative humidity.

Figure 8:
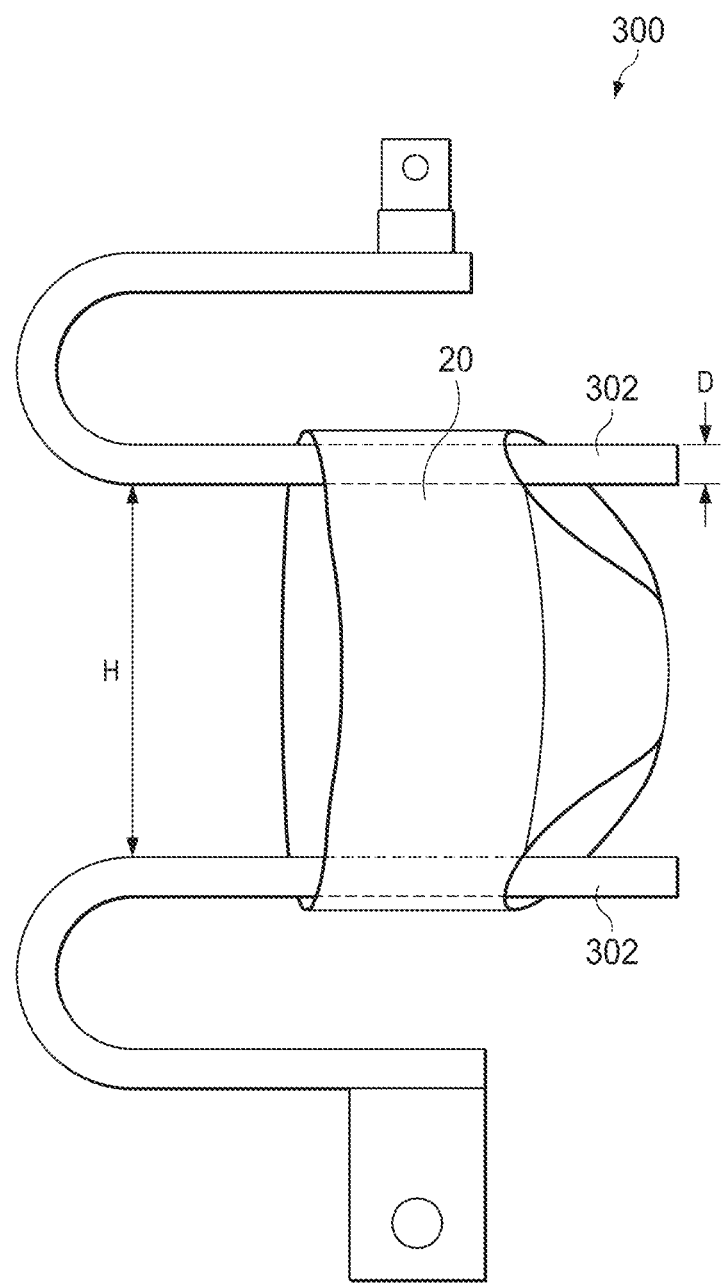
FIG. 8 is a schematic view of an example of a hanger-type sample holding fixture according to the "Whole Article Force Measurement" herein.

The tensile tester is fitted with hanger-type sample holding fixtures (300) as shown in FIG. 8. Each fixture comprises a rigid linear rubber-coated horizontal bar section (302) to prevent sample slippage during testing. The outer bar diameter (including the rubber coating) of the horizontal bar sections is 10.0 mm. The central axes of the horizontal bar sections (302) are configured to remain parallel and in the same vertical plane throughout the test procedure. The gauge circumference is determined by the following equation:

Gauge Circumference=2×(*H*+*D*+π*D*/2)

where H is the vertical gap between the horizontal bar sections (302), and D is the outer diameter of the bar. The instrument is set up to go through the following steps:

| | |
|---|---|
| Crosshead Speed | 254.0 mm/min |
| Final Load Point | 19.61N |
| Hold Time | 0 |
| Number of Cycles | 1 |
| Data Acquisition Rate | 50 Hz |

An article (20) sample is inserted onto the upper horizontal bar section (302) so that the bar passes through the waist opening and one leg opening of the article. The crosshead is raised until the specimen hangs above the lower bar and does not touch lower bar (302). The load cell is tared and the crosshead is lowered to enable the lower bar (302) to be inserted through the waist opening and other leg opening without stretching the article. The article is adjusted so that the longitudinal centerline L1 of the article is in a horizontal plane halfway between the upper and lower bars (302). The center of the side portion in contact with the bar (302) is situated on the same vertical axis as the instrument load cell. The crosshead is raised slowly while the article is held in place by hand as necessary until the force is between 0.05 and 0.1N, while taking care not to add any unnecessary force. The gauge circumference at this point is the Initial Gauge Circumference. The test is initiated and the crosshead moves up at 254 mm/min until a force of 19.6N is attained, then the crosshead immediately returns to the Initial Gauge Circumference at the same speed. The maximum circumference at 19.6N and the force at 70% of the maximum circumference during the loading segment and unloading segment of the test are recorded.

The maximum circumference at 19.6N is defined as the Full Stretch Circumference (mm). The Full Stretch Circumference (mm)×0.7 is defined as the 70% Stretch Circumference. The Waist Circumference Force is defined as the force at 70% stretch circumference during the load (extension) segment of the test. Five samples are analyzed and their average are calculated and reported to the nearest 0.01N, respectively.

Belt Zone Tensile Stress Measurement

The tensile stress (N/m) is calculated by tensile force (N) divided by the specimen width (m). Force may be measured using an Electronic Tensile Tester with a computer interface such as the MTS Criterion C42 running TestWorks 4 Software (available from MTS SYSTEMS (CHINA) CO., LTD) or equivalent instrument. A load cell is chosen so that force results for the samples tested will be between 10% and 90% of capacity of the load cell. The instrument is calibrated according to the manufacturer's instructions. All testing is performed in a room maintained at 23±2° C. and 50±5% relative humidity. The instrument is equipped with single line contact grips at least as wide as the test specimen.

To obtain test specimens, the sample article is cut open along the side seams (32), and the front and belt elastic belt sections (40) are removed from the absorbent main body (38) by separating the bonding between them, and further the waist guard portion WGP is separated from the belt to which it is attached. Cold Spray may be used, paying attention not to make wrinkles in the belt sections. Care is taken not to spray on any belt elastic member (96F, 96S). The obtained elastic belt samples are severed into zones (102, 103, 1031-WGEP, 1031-CP, 104, 105, 106, 108) according to the present invention with care not to cut any elastic member (96F, 96S). Samples are pre-conditioned at 23° C.±2° C. and 50%±5% relative humidity for two hours prior to testing.

The instrument is set up to go through the following steps. Initial Gauge Length is calculated from the Initial Gauge Circumference which is determined during the Whole Article Force Test using separate identical articles, as described above. Initial Gauge Length=0.5×Initial Gauge Circumference. The final gauge length is calculated from the Full Stretch Circumference which is determined during the Whole Article Force Test, as described above.

| | |
|---|---|
| Crosshead Speed | 254.0 mm/min |
| Data Acquisition Rate | 50 Hz |
| Final Gauge Length | 0.5 × Full Stretch Circumference |
| Hold Time | 0 |
| Number of Cycles | 1 |

One end of the specimen is clamped into the upper clamp and the load is tared. The other end of the specimen is clamped into the lower clamp. Approximately 5 mm of each end of the specimen is behind the contact line of the grip. The test is started and the specimen is extended to the final gauge length at a crosshead speed of 254 mm/min, then immediately returned to the original gauge length at the same speed. The specimen is extended in the article transverse direction during the test. The unload force at 70% of the Final Gauge Length during the unload segments of the test is recorded.

Five articles are analyzed and the unload forces are recorded for each of the zones. The average tensile force (N) is calculated to the nearest 0.01 N for each. The tensile stress for each zone is calculated by the average tensile force (N) divided by the average specimen width (m) and reported to the nearest 0.1 N/m.

EXAMPLES

Examples 1 and 2

Belt-type pant absorbent article of the present invention in Size 3 (M size) having an elastic profiling of the back elastic belt according to Table 1 below. For each example, the protective zone comprising the waist guard portion WGP was positioned at from 28% to 55% of LS only on the back elastic belt. For each example, the 2 elastic strands on the correlated portion CP had an elastic cut window. For each example, there were 18 elastic members each disposed on the front elastic belt and the back elastic belt.

Comparative Example 1

Belt-type pant absorbent article in Size 3 (M size) sold by the tradename of "Pampers Sarasara Care Pant" having Lot No. 0058 202250 03:35 202000227 manufactured for the Japanese market. The front elastic belt had a very similar size, structure, and elastic profiling as Examples 1-2. The back elastic belt size is the same size as Examples 1-2 while being devoid of a waist guard portion WGP and having an elastic profiling of the back elastic belt according to Table 1 below in corresponding positions. There were 18 elastic members each disposed on the front elastic belt and the back elastic belt.

TABLE 1

| | dtex/elongation%/number of elastic members (dimension of elastic cut window) | | |
|---|---|---|---|
| | Example 1 | Example 2 | Comparative Example 1 |
| Waist zone | 470dtex/180%/3 | 470dtex/180%/3 940dtex/130%/2 | 470dtex/180%/4 940dtex/130%/2 |
| Protective zone Waist Guard Portion | 940dtex/210%/4 | 940dtex/210%/3 | NA |

TABLE 1-continued

| | dtex/elongation%/number of elastic members (dimension of elastic cut window) | | |
|---|---|---|---|
| | Example 1 | Example 2 | Comparative Example 1 |
| Protective zone other than Waist Guard Portion | 470dtex/180%/1 940dtex/130%/2 (114 mm) | 940dtex/130%/2 (114 mm) | 940dtex/130%/2 470dtex/180%/2 |
| Buttock zone | 940dtex/130%/2 (114 mm) 470dtex/240%/3 (114 mm) | 470dtex/180%/2 (114 mm) 470dtex/240%/3 (114 mm) | 470dtex/180%/2 470dtex/240%/3 (114 mm) |
| Buttock cover zone | 470dtex/240%/3 (114 mm) | 470dtex/240%/3 (114 mm) | 470dtex/240%/3 (114 mm) |

For Examples 1 and 2, the Waist Circumference Force according to the Whole Article Force Measurement herein, and the tensile stress of the waist guard elastic portion WGEP and the correlated portion CP according to the Belt Zone Tensile Stress Measurement herein, were measured. Results are provided in Table 2 below.

TABLE 2

| | Example 1 | Example 2 |
|---|---|---|
| Waist Circumference Force (N) | 5.6 | 5.5 |
| Tensile stress of waist guard elastic portion (N/m) | 43.0 | 70.0 |
| Tensile stress of correlated portion (N/m) | 18.3 | 25.5 |

Examples 1-2 as well as Comparative Example 1 provide good stretchability for ease of application, good fit for preventing sagging, good comfort and softness, and good breathability. Examples 1-2 provide good protection against leakage of runny fecal matter from the waist opening on the back side. Examples 1-2 may be manufactured at substantially the same speed as manufacturing Comparative Example 1, and at an upcharge of material cost of no more than about 5%.

Leakage Incident 100 panelists who were caregivers of babies using Size 3 (M size) weighing 6-11 kg and 4-12 months in age, with approximately equal number of males and females, and having a mixture of usage experience of major brands of similar price range, were recruited. Upon recruiting, each of the panelists were asked to confirm if their baby had experience of low viscosity fecal matter. (Not all of the 100 panelists provided response.) Each panelist was asked to use 5 test samples at various sequence for 5 days each, and enough samples were provided to test each test sample. Among the 5 test samples were Example 1, Example 2, and Comparative Example 1. The panelists were asked to report the number of samples which were contained with fecal matter, and the number of incidents of leakage of fecal matter from the back waist. The percentage of leakage of fecal matter from the back waist based on the number of samples which were contained with fecal matter, is provided in Table 3.

TABLE 3

| Value | Example 1 | Example 2 | Comparative Example 1 |
|---|---|---|---|
| Number of samples used with fecal matter | 553 | 525 | 570 |

TABLE 3-continued

| Value | Example 1 | Example 2 | Comparative Example 1 |
|---|---|---|---|
| Percentage of leakage from back waist (%) | 4.3 | 7.2 | 11.4 |

Examples 1 and 2 provided statistically significantly less percentage, at 95% confidence level, of leakage compared to Comparative Example 1.

Consumer Acceptance

After the same test as described above for "Leakage Incident", each panelist was asked to fill in a questionnaire. In the questionnaire, there were more than 7 values as found in Table 4, and each panelist was requested to rate the test samples against those values using 5 ratings, which were scored as such: "Poor"=0, "Fair"=25, "Good"=50, "Very Good"=75, and "Excellent"=100. The scores were averaged and provided in Table 4 below. (Not all of the panelists provided response, thus the "Base Size" varies.)

TABLE 4

| Value | Example 1 | Example 2 | Comparative Example 1 |
|---|---|---|---|
| Base Size | 99 | 99 | 97 |
| Overall after usage | 61 CE1 (*2) | 58 | 53 |
| Prevents fecal matter leakage | 62 CE1 | 65 CE1 | 52 |
| Overall softness | 62 CE1 | 58 | 55 |
| Overall fit | 66 | 68 CE1 | 62 |
| Comfortable for baby | 62 | 62 | 60 |
| No sagging | 67 | 69 | 68 |
| Breathable | 63 CE1 | 59 | 57 |

(*2) The markings of Example numbers after the scores indicate "statistically significantly better"

against the marked Example at 95% confidence level. For example, "Overall after usage" rating of Example 1 was statistically significantly better than Comparative Example 1 (CE1).

According to this test, Examples 1 and 2 which meet the requirements of the present invention have statistically significantly higher acceptance in "Prevents fecal matter leakage" than Comparative Example 1. Example 1 and 2 also provided improvement compared to Comparative Example 1 for values "Overall after usage", "Overall softness", "Overall fit", and "Breathable", while having about the same acceptance in values "Comfortable for baby" and "No sagging".

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An absorbent article having a longitudinal direction and a transverse direction comprising a front elastic belt, a back elastic belt, a crotch region, a waist opening, and a pair of leg openings; the crotch region extending longitudinally between the front elastic belt and the back elastic belt;
the absorbent article comprising an absorbent main body extending an entire longitudinal dimension of the crotch region and further extending partly into each of the front elastic belt and the back elastic belt, the absorbent main body comprising a liquid pervious topsheet, a liquid impervious backsheet, and an absorbent material region sandwiched therebetween;
an entirety of a length of the transverse edges of the front elastic belt is seamed with a certain length of transverse edges of the back elastic belt to define a pair of side seams, wherein the side seams have a seam length LS; and
wherein the back elastic belt divided into multiple zones spanning in the transverse direction and defined by its location from a distal edge to a proximal edge relative to a percentage of the seam length LS, wherein the distal edge is considered 0% and the proximal edge is considered 100%; and
wherein a waist guard portion extends towards the crotch region from a closed base line towards an open edge, wherein the waist guard portion is partially bonded to a remainder of the back elastic belt to define a pocket, wherein an area of the pocket substantially superposes the backsheet, wherein the back elastic belt is divided into 3 zones wherein: 0% to a distal edge of the waist guard portion is a back waist zone, the distal edge to a proximal edge of the waist guard portion is a protective zone, and the proximal edge of the waist guard portion to 100% is a buttock zone, wherein elastic members are disposed on each of the back waist zone, the protective zone other than the waist guard portion, and the buttock zone, and a tensile stress of the protective zone is higher than a tensile stress of either the back waist zone or the buttock zone.

2. The absorbent article of claim 1, wherein the waist guard portion comprises a waist guard elastic portion having a longitudinal dimension of no greater than 40 mm, wherein a remainder of the back elastic belt superposing the waist guard elastic portion defines a correlated portion, a tensile stress of the waist guard elastic portion is at least 25% higher than a tensile stress of the correlated portion.

3. The absorbent article of claim 1, wherein the elastic members disposed on a correlated portion comprises an elastic cut window.

4. The absorbent article of claim 1, wherein the waist guard portion is disposed within a location of from about 25% to about 60% of LS, the waist guard portion.

5. The absorbent article of claim 1, wherein the absorbent main body comprises a pair of leg cuffs disposed along both transverse edges extending in the longitudinal direction, wherein the leg cuffs are in active elasticity at the open edge.

6. The absorbent article of claim 1, wherein at least about 3% of the area of the pocket superposes the absorbent material region.

7. The absorbent article of claim 1, wherein the waist guard elastic portion is elasticized by disposing a plurality of elastic strands, wherein one elastic strand is disposed from no less than 2 mm to 5 mm away from the open edge.

8. The absorbent article of claim 7, wherein the plurality of elastic strands of the waist guard elastic portion are disposed at a pitch of no more than 12 mm.

9. The absorbent article of claim 7, wherein at least 2 of the elastic strands of the waist guard elastic portion have a color which is visible from the member facing side of the article.

10. The absorbent article of claim 9, wherein the front waist zone or the back waist zone is disposed of elastic strands of the same or similar color as the colored elastic strands of the waist guard elastic portion.

11. The absorbent article of claim 1, wherein the longitudinal dimension of the pocket defined as the shortest distance between the closed base line to the open edge is from about 20 mm to about 45 mm.

12. The absorbent article of claim 1, wherein the combined thickness of the waist guard elastic portion, the correlated portion, and the portion of the absorbent main body sandwiched therebetween; is no more than 5 mm.

13. The absorbent article of claim 12, wherein the absorbent main body further comprises an acquisition system, wherein the acquisition system does not superpose the pocket.

14. The absorbent article of claim 1, wherein any portion of the back elastic belt is made of less than 6 layers of substrates.

15. The absorbent article of claim 1, wherein the distance between the waist opening to the longitudinal edge of the absorbent main body is shorter on the back side than the front side.

16. The absorbent article of claim 1, wherein the front elastic belt region is divided into 4 zones spanning in the transverse direction and defined by its location from the distal edge to the proximal edge relative to the percentage of the seam length LS wherein the distal edge is considered 0% and the proximal edge is considered 100% wherein; 0-25% is a front waist zone, 25-50% is a distal tummy zone, 50-85% is a proximal tummy zone, and 85-100% is a leg zone, wherein the front proximal tummy zone has the highest tensile stress compared to other zones in the front elastic belt.

17. The absorbent article of claim 1, having a disposal tape attached to the garment facing surface of the back elastic belt.

18. The absorbent article of claim 1, wherein the Waist Circumference Force according to the Whole Article Force Measurement herein is no more than 9N.

19. The absorbent article of claim 1, wherein the back elastic belt is formed by an outer sheet, an inner sheet, and a plurality of elastic strands, wherein the outer sheet is apertured.

20. The absorbent article of claim 1, wherein the absorbent main body comprises an outer cover layer on the garment facing side, wherein the outer cover layer is apertured.

* * * * *